(12) United States Patent
Lavigne et al.

(10) Patent No.: US 11,806,734 B2
(45) Date of Patent: Nov. 7, 2023

(54) LOCKING NOZZLES

(71) Applicant: Hewlett-Packard Development Company, L.P., Spring, TX (US)

(72) Inventors: Mathew Lavigne, Boise, ID (US); Jeffrey H. Luke, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 623 days.

(21) Appl. No.: 17/048,412

(22) PCT Filed: Aug. 30, 2018

(86) PCT No.: PCT/US2018/048722
§ 371 (c)(1),
(2) Date: Oct. 16, 2020

(87) PCT Pub. No.: WO2020/046310
PCT Pub. Date: Mar. 5, 2020

(65) Prior Publication Data
US 2021/0154689 A1 May 27, 2021

(51) Int. Cl.
- *B05B 1/32* (2006.01)
- *B33Y 40/00* (2020.01)
- *B29C 64/321* (2017.01)
- *B41J 2/175* (2006.01)

(52) U.S. Cl.
CPC ............ *B05B 1/326* (2013.01); *B29C 64/321* (2017.08); *B33Y 40/00* (2014.12); *B41J 2/17506* (2013.01); *B41J 2/17596* (2013.01)

(58) Field of Classification Search
CPC ....... B05B 1/326; B29C 64/321; B33Y 40/00; B41J 2/17509; B41J 2/17596
See application file for complete search history.

(56) References Cited

U.S. PATENT DOCUMENTS

| | | | |
|---|---|---|---|
| 5,495,877 A | 3/1996 | Schwenk et al. | |
| 5,646,664 A * | 7/1997 | Pawlowski, Jr. | B65D 47/261 347/86 |
| 5,947,171 A * | 9/1999 | Woodruff | B65D 81/3211 141/354 |
| 6,196,522 B1 * | 3/2001 | Yuen | B67D 7/0294 251/351 |

(Continued)

FOREIGN PATENT DOCUMENTS

| | | |
|---|---|---|
| CN | 101446361 A | 6/2009 |
| DE | 200 17 879 U1 | 11/2001 |

(Continued)

*Primary Examiner* — Vishal Pancholi
(74) *Attorney, Agent, or Firm* — Foley & Lardner LLP

(57) ABSTRACT

An example of a device (100) may include a valve body (108); a printing substance dispensing nozzle (110) rotatable within the valve body (108) between a sealed orientation and a dispensing orientation; and a locking rod extending through a locking rod window (146) in the valve body (108) and into a locking rod channel (144) in the printing substance dispensing nozzle (110), wherein the locking rod is movable within the locking rod window (146) between a first position, fixing the printing substance dispensing nozzle (110) in the sealed orientation, and a second position allowing rotation of the printing substance dispensing nozzle (110) to the dispensing orientation.

13 Claims, 10 Drawing Sheets

(56) References Cited

U.S. PATENT DOCUMENTS

| | | | |
|---|---|---|---|
| 6,371,175 B1 | 4/2002 | Nusbaumer et al. | |
| 6,889,026 B2 | 5/2005 | Schlageter et al. | |
| RE44,310 E | 6/2013 | Chadbourne et al. | |
| 8,761,639 B1 | 6/2014 | Leemhuis et al. | |
| 8,985,165 B2 | 3/2015 | Wegman et al. | |
| 9,477,177 B2 | 10/2016 | Leemhuis et al. | |
| 9,555,642 B2 | 1/2017 | Gonzalez | |
| 2003/0188800 A1* | 10/2003 | Woodruff | B65D 71/502 141/346 |
| 2019/0061359 A1* | 2/2019 | Duca | B41J 2/17553 |

FOREIGN PATENT DOCUMENTS

| | | |
|---|---|---|
| EP | 0 722 837 A1 | 7/1996 |
| EP | 0 856 475 A1 | 8/1998 |
| EP | 1 165 430 A1 | 1/2002 |
| EP | 3 359 382 A1 | 8/2018 |
| JP | 2016-10859 A | 1/2016 |

\* cited by examiner

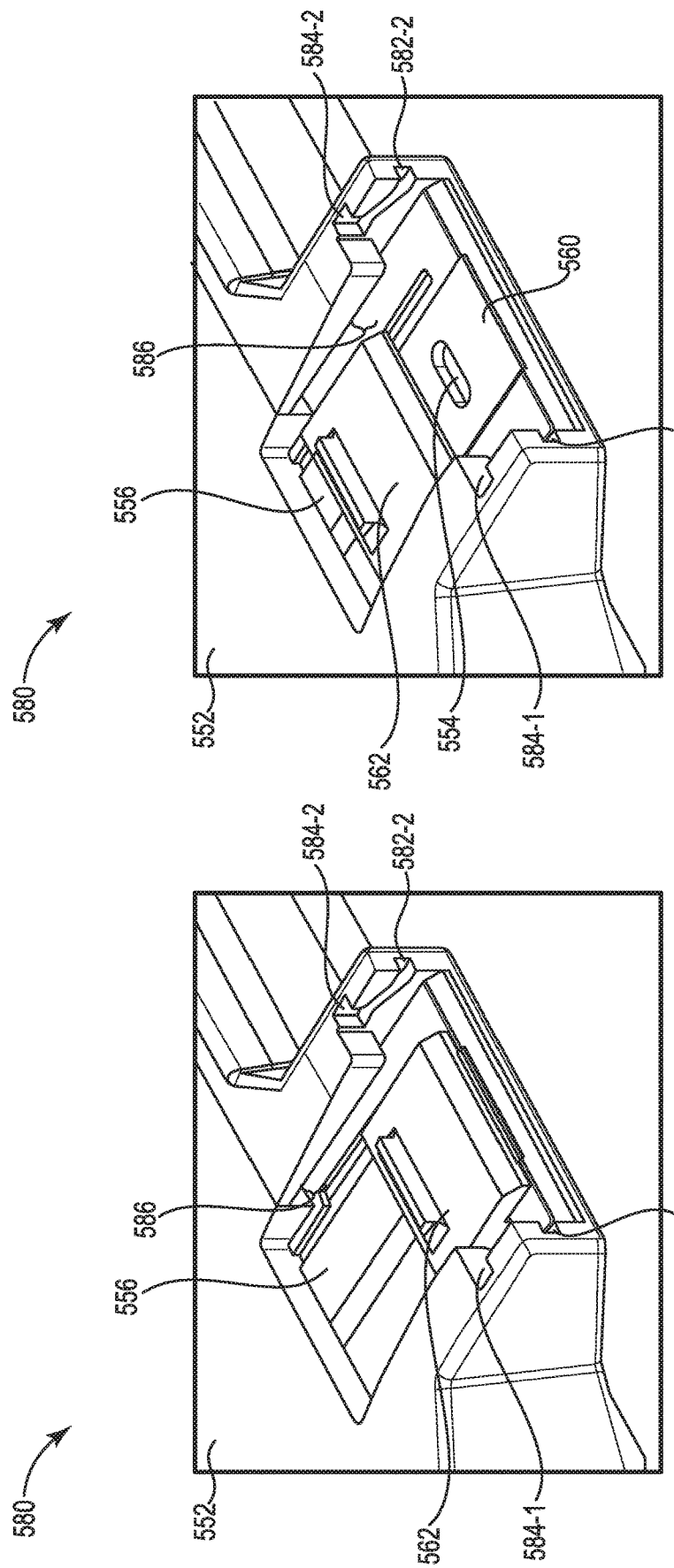

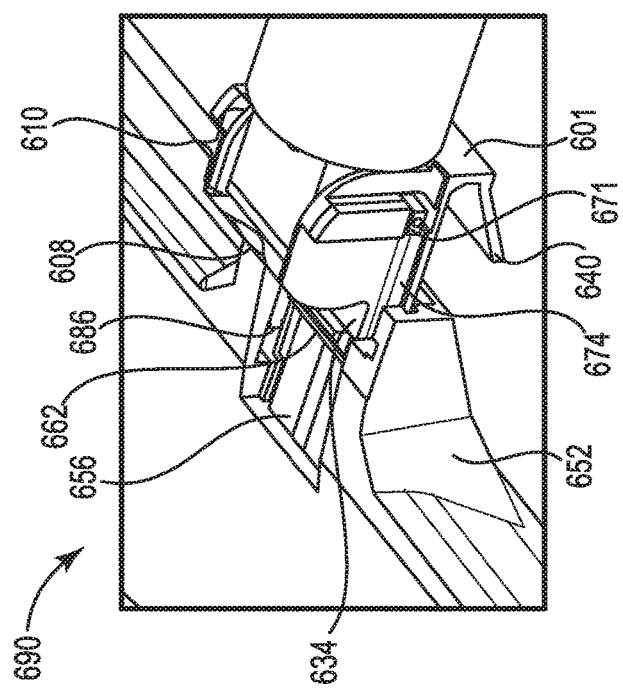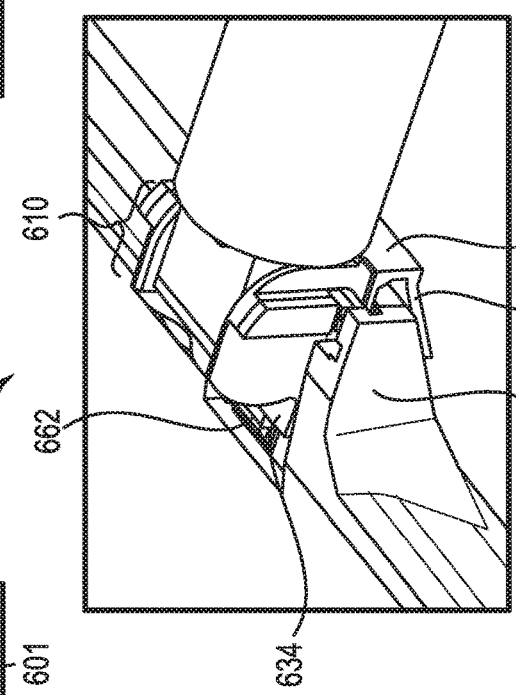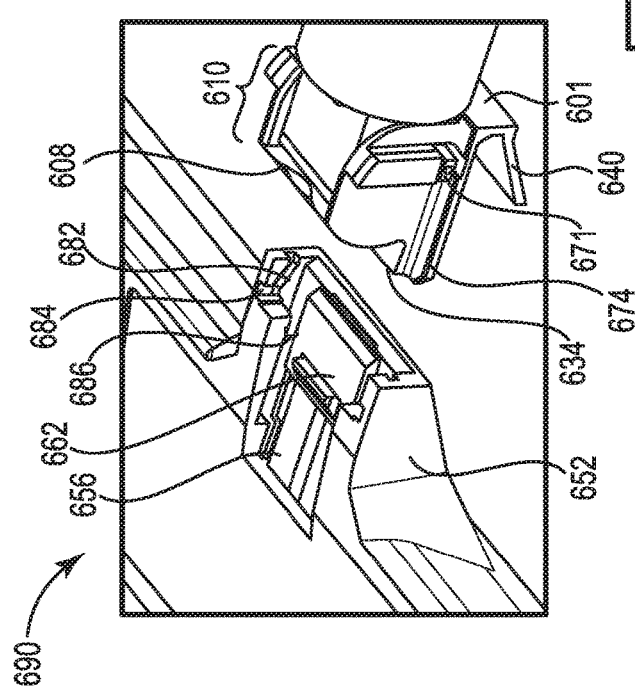

LOCKING NOZZLES

BACKGROUND

A variety of containers may be utilized to contain, store, transport, and/or transfer substances. Dispensable substances may be transferred between such containers. A dispensing container and a receiving container may include complementary mating interfaces. Leaks, spills, residual buildup, and/or contamination of a dispensable substance may occur at the mating interfaces of the containers.

BRIEF DESCRIPTION OF THE DRAWINGS

FIG. 5A illustrates an example of a device, mate-able with a lockable printing substance dispensing nozzle, in a closed orientation consistent with the disclosure.

FIG. 5B illustrates an example of a device, mate-able with a lockable printing substance dispensing nozzle, in an open orientation consistent with the disclosure.

FIG. 6A illustrates an example of a mating system, for lockable printing substance dispensing nozzles, in a disengaged position consistent with the disclosure.

FIG. 6B illustrates an example of a mating system, for lockable printing substance dispensing nozzles, in a partially engaged position consistent with the disclosure.

FIG. 6C illustrates an example of a mating system, for lockable printing substance dispensing nozzles, in a fully engaged position consistent with the disclosure.

DETAILED DESCRIPTION

Figure 1:
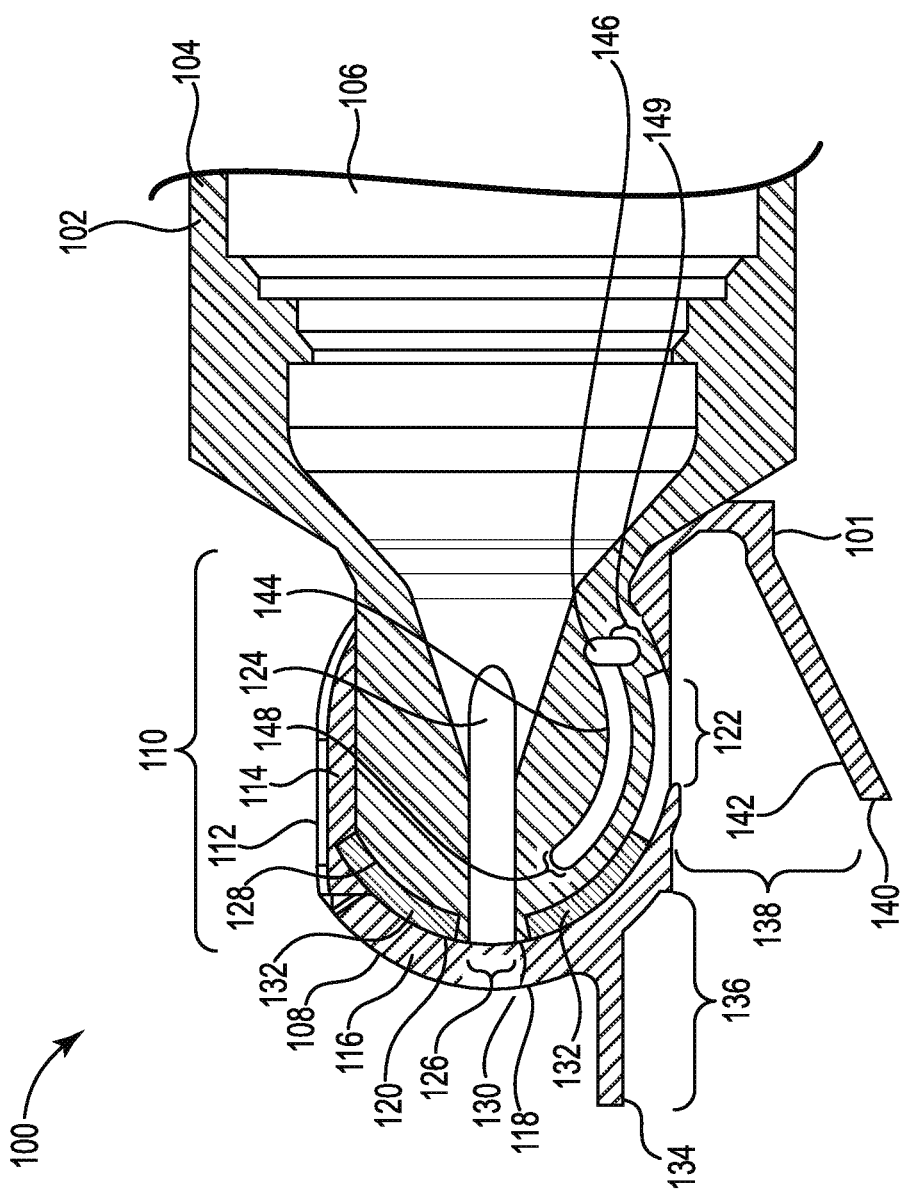
FIG. 1 illustrates a cross-sectional view of an example of a device, with a lockable printing substance dispensing nozzle, in a sealed orientation consistent with the disclosure.

A container may be utilized to contain, store, transport, and/or transfer various substances. For example, a container may be utilized to contain, store, transport, and/or transfer a printing substance. For example, a printing device may utilize a printing substance to generate a printed material. A printing device may include a device that utilizes digital and/or electronic input to generate, with the printing substance, a physical instantiation of the input as printed material. A wide variety of printing devices exist including inkjet printers, laser printers, three dimensional (3D) printers, etc. As such, a wide variety of printing substances exist such as a liquid printing ink, a printing toner powder, and/or three-dimensional printing substance, etc.

A printing device may utilize a container to act as a reservoir or supply container of printing substance. Further, containers may be utilized to refill a reservoir or supply container of a printing substance.

Containers utilized to contain, store, transport, and/or transfer a printing substance may be configured to contain the printing substances in a manner that excludes the external environment from the printing substance and vice versa. Excluding the printing substance from the external environment may preserve the printing substance, the environment, the health of a user, the functionality of the printing device, and/or the functionality of the container.

For example, a printing substance may be modified and/or degraded by exposure to environmental contaminants. Such contaminants may include particulate matter, reactants, atmosphere, gases, liquids, solids, etc. A container may block exposure of the printing substance to such contaminants.

Further, if contaminants are introduced to a printing substance, the contaminants may become resident in the printing substance and/or the container. Some printing devices may include mechanical, electrical, and/or chemical components that may be damaged or degraded as a result of encountering the contaminants. Therefore, when a contaminated printing substance is utilized by the printing device in a printing operation, the contaminants may encounter the components and cause the printing device to sustain damage and/or malfunction.

Furthermore, the printing substance itself may become a contaminant to a printing device, a user of the printing device, and/or the environment of a printing device. For example, if the printing substance is spilled or leaked outside of a container it may encounter and/or build up on the components of the printing device. This exposure and/or build up may result in a mess and/or in damage to the components.

In another example, spilling or leaking the printing substance outside of the container where a user may encounter them may result in a mess and/or damage to a user's health.

In another example, spilling or leaking the printing substance outside of the container into the environment may cause a mess and/or damage to the environment.

As such, some containers may be configured to maintain the printing substance sealed within walls of the container. The print substance may be sealed within the walls of the container in a manner that excludes the above-described contaminants. For example, a container may be completely sealed or capped with the print substance inside of it.

However, on some occasions the printing substance may be transferred from one container to another. For example, a printing device may include a container such as a printing substance supply cartridge. The print substance supply cartridge may serve as a reservoir for the printing substance until a time when the printing substance is to be utilized by the printing device to perform a printing operation. For example, a printing device may include a printing substance supply cartridge that directly supplies the printing substance to a printing head or other printing mechanism of the printing device without intermediaries and/or conduits.

The supply cartridge of the printing device may also be configured to operate as a receiving container. As a receiving container a supply cartridge may receive printing substance from a dispensing container. For example, a supply cartridge of the printing device may be fillable and/or refillable with a printing substance from a dispensing container.

A dispensing container may include a container to contain a print substance during shipping, storage, and prior to being dispensed into the receiving container. For example, a dispensing container may include a print substance refill container to refill the supply cartridge of the printing device, A printing substance may be transferred from the dispensing container into the supply cartridge.

The dispensing container and the receiving container may include complementary interfaces to achieve and/or maintain alignment during the transfer of a printing substance. The interfaces may include openings in the dispensing container and in the receiving container that allow for the printing substance to pass from the dispensing container into the receiving container. These openings, and the interfaces in general, may be points at which the containers leak printing substance and are exposure points for environmental contaminants.

Various sealing mechanisms such as trap doors, screw caps, and/or pressure valves may be utilized to seal the openings. However, such mechanisms are imprecisely actuated, are cumbersome, do not address premature dispensing of a printing substance, do not address residual printing substance left after the transfer, do not address late dispensing of a printing substance, and/or operate regardless of alignment between the openings of the interfaces.

In contrast, examples of the present disclosure may include devices and mating systems for mating interface gaskets that maintain alignment and maintain a seal of a dispensing container until an interface of the dispensing container is mated with an interface of the receiving container. The systems and mating devices may operate to keep the printing substance sealed within the dispensing container until openings through the dispensing-side interface and the receiving side interface are in alignment. Further the systems and devices may operate to wipe the dispensing-side interface and/or the receiving-side interface clean of print substance and/or contaminants before and after the transfer of printing substance between the containers. Furthermore, the systems and mating devices may operate to lock a printing substance dispensing nozzle in a sealed orientation when the dispensing-side mating interface and/or the receiving-side mating interface are not fully engaged. Additionally, the systems and mating devices may operate to lock the dispensing-side mating interface and the receiving-side mating interface into engagement when the printing substance dispensing nozzle is rotating and/or is in a dispensing orientation For example, a device of the present disclosure may include a valve body; a printing substance dispensing nozzle rotatable within the valve body between a sealed orientation and a dispensing orientation; and a locking rod extending through a locking rod window in the valve body and into a locking rod channel in the printing substance dispensing nozzle, wherein the locking rod is movable within the locking rod window between a first position, fixing the printing substance dispensing nozzle in the sealed orientation, and a second position allowing rotation of the printing substance dispensing nozzle to the dispensing orientation.

FIG. 1 illustrates a cross-sectional view of an example of a device 100, with a lockable printing substance dispensing nozzle 110, in a sealed orientation consistent with the disclosure. The device 100 may include a dispensing-side mating interface 101. The dispensing-side mating interface 101 may include an interface for mating a print substance dispensing container 102 to a print substance receiving container (not illustrated in FIG. 1).

The device 100 may include a print substance dispensing container. The print substance dispensing container 102 may include a print substance reservoir. For example, the print substance dispensing container 102 may include a print cartridge refilling device.

The print substance dispensing container 102 may include a wall 104. The wall 104 may encompass and/or define a channel 106 of the print substance dispensing container 102. Dispensable printing substance may be contained within the channel 106. The wall 104 may separate the printing substance within the channel 106 from the external environment.

The device 100 may include a valve body 108. The valve body 108 may include a plurality of walls. The plurality of walls of the valve body 108 may encompassing and/or define a cavity of the valve body 108.

The plurality of walls may include a pair of substantially parallel sidewalls separated by the cavity. An example of a sidewall 112 may include an internal face 114 and an external face. The external face of a sidewall 112 of the valve body 108 may face away from the cavity and into the environment. The internal face 114 of the sidewall 112 may face in an opposite direction from the external face of the sidewall 112, For example, internal face 114 of the sidewall 112 may face into the cavity of the valve body 108. The internal face 114 of the sidewall 112 may be substantially planar and/or flat, creating a substantially planar and/or flat interface with the cavity of the valve body 108.

The plurality of walls may also include a front wall 116, The font wall 116 may be a wall that spans between and connects the parallel sidewalls of the valve body 108, The front wall 116 may be substantially perpendicular to the sidewalls between which it spans. The front wall 116 may, in combination with the sidewalls, encompass and/or define the cavity of the valve body 108.

For example, the front wall 116 may include an internal face 120 and an external face 118. The external face 118 of the front wall 116 may face away from the cavity of the valve body 108 and into the environment. The external face 118 of the front wall 116 may be a substantially convex curved surface.

In contrast, the internal face 120 of the front wall 116 may face in an opposite direction from the external face 118. For example, internal face 120 of the front wall 116 may face into the cavity of the valve body 108. The internal face 120 of the front wall 116 may be a substantially concave curved surface. As such, when viewed from the front wall 116, the valve body 108 may have the appearance of a partial cylinder or prism with a convex external face 118 and/or concave internal face 120 of the front wall 116 spanning between the two substantially parallel sidewalls. The front wall 116 may terminate prior to extending all the way around the periphery of the valve body 108 cavity. That is, an opening spanning between the sidewalls may exist between the cavity of the valve body 108 and the external environment.

The valve body 108 may include a print substance transfer window 122. The print substance transfer window 122 may include a window through the valve body 108. The print substance transfer window 122 may be separate from the opening described above. The print substance transfer window 122 may be separated from the opening described above by a portion of the front wall 116. The print substance transfer window 122 may include an opening spanning through the valve body 108. The print substance transfer window 122 may extend through the front wall 116 into the cavity of the valve body 108. The print substance transfer window 122 may serve as a conduit for print substance transfer between the cavity of the valve body 108 and a print substance receiving container outside of the valve body 108.

The device 100 may include a printing substance dispensing nozzle 110. A print substance dispensing nozzle 110 may include an internal wall shaped to control the direction and/or characteristics of the flow of a printing substance. For example, the printing substance dispensing nozzle 110 may include a wall within a body of a printing substance dispensing nozzle that directs the flow of print substance from the printing substance dispensing container 102.

In some examples, the walls of the printing substance dispensing nozzle 110 may encompass and/or define a nozzle channel 124. The nozzle channel 124 may have a smaller volume and/or diameter than the channel 106 of the printing substance dispensing container 102. The nozzle channel 124 may be encased inside of a body of the printing substance dispensing nozzle 110. The body of the printing substance dispensing nozzle 110 may include a plurality of external walls in addition to the internal walls defining the nozzle channel 124

In some examples, the internal walls of the printing substance dispensing nozzle 110 may converge to an orifice 126. The orifice 126 in the print substance dispensing nozzle 110 may be an opening through which printing substance is expelled. For example, the internal walls of the printing substance dispensing nozzle 104 may direct the flow of a printing substance from the channel 106 of the printing substance dispensing container 102 through the nozzle channel 124 and out of the orifice 126 when the orifice is not obstructed.

The orifice 126 of the print substance dispensing nozzle 110 may be an orifice 126 through an external wall of the printing substance dispensing nozzle 110. For example, the orifice 126 may include an opening through a front wall 128 of the body of the printing substance dispensing nozzle 110. The front wall 128 of the print substance dispensing nozzle 110 may include a substantially convexly curved external wall. The convexly curved external surface of the front wall 128 may have a complementary geometry to the geometry of the concavely curved internal face 120 of the front wall 116 of the valve body 108. The front wall 128 of the body of the printing substance dispensing nozzle 110 may be perpendicular to and span between two substantially planar and/or flat parallel sidewalls of the body of the printing substance dispensing nozzle 110.

The printing substance dispensing nozzle 110 may occupy the cavity of the valve body 108. That is, the printing substance dispensing nozzle 110 may be fit within the front wall 116 and the sidewalls of the valve body 108. A portion of the printing substance dispensing nozzle 110 opposite the orifice 126 may protrude from the cavity of the valve body 108 through the opening between the two terminuses of the front wall 116 of the valve body 108. That is, a portion of the printing substance dispensing nozzle 110 may protrude from the cavity of the valve body 108 through the opening between the sidewalls of the valve body 108 where the front wall 116 is absent.

The protruding portion of the printing substance dispensing nozzle 110 may maintain fluid communication between the nozzle channel 124 and the channel 106 of the print substance dispensing container 102. As such, the printing substance dispensing container 102 may be contiguous with the printing substance dispensing nozzle 110. Accordingly, the printing substance dispensing container 102 may be utilized as a printing substance reservoir outside of the valve body 108 to supply print substance to the printing substance dispensing nozzle 110 within the valve body 108.

The printing substance dispensing nozzle 110 may be fixed within the cavity of the valve body 108. For example, the printing substance dispensing nozzle 110 may be press fit or friction fit within the cavity of the valve body 108. The printing substance dispensing nozzle 110 may be fixed within the valve body 108 such that the removal of the printing substance dispensing nozzle 110 would involve the application of forces outside of the forces encountered when rotating the printing substance dispensing nozzle 110 within the valve body 108, as described below.

In an example, the printing substance dispensing nozzle 110 may be fixed within the valve body by a male-female connection between a protrusion off of an external wall of the printing substance dispensing nozzle 110 a complementary window or recess in the sidewall 112 of the valve body 108. For example, cylindrical protrusions may protrude outward from the external surface at an approximate center of the sidewalls of the printing substance dispensing nozzle 110. The cylindrical protrusions may mate into a complementary window or recess in the sidewalls of the valve body 108 to fix the printing substance dispensing nozzle 110 within the cavity of the valve body 108.

Although the printing substance dispensing nozzle 110 may be fixed with respect to removal from the cavity of the valve body 108, the printing substance dispensing nozzle 110 may be rotatable within the valve body 108. For example, the printing substance dispensing nozzle 110 may be rotatable within the cavity of the valve body 108 about a rotational axis. The rotational axis may extend through a center of the cylindrical protrusions off of the sidewalls. The rotational axis may be perpendicular with respect to a longitudinal length of the nozzle channel 124 and/or may bisect the nozzle channel 124 perpendicular to the longitudinal length of the nozzle channel 124.

The printing substance dispensing nozzle 110 may be rotated by application of a force to the printing substance dispensing container 102. For example, a user may grasp the print substance dispensing container 102 that is continuous with the print substance dispensing nozzle 110 and push the printing substance dispensing container 102 toward the front wall 116 of the valve body 108. As a result, the printing substance dispensing nozzle 110 that is connected to the printing substance dispensing container may rotated in a first direction within the valve body 108. Likewise, the user may pull the printing substance dispensing container 102 away from the front wall 116 of the valve body 108 causing rotation of the connected printing substance dispensing nozzle 110 in an opposite direction from the push. In an example, the printing substance dispensing nozzle 110 may be rotated within the valve body 108 approximately ninety degrees about the rotational axis within the cavity before the printing substance dispensing nozzle 110 encounters a portion of the front wall 116 of the valve body 108 impeding it from rotation any further in that direction.

The external surface of the front wall 128 the print substance dispensing nozzle 110 may be recessed. For example, the external surface of the front wall 128 may be recessed with respect to the orifice 126 and/or an orifice wall 130 that encompasses and/or defines the orifice 126. The orifice wall 130 may be in contact with the internal face 120 of the valve body 108. As such, a gap may exist surrounding the orifice wall 130 between the external surface of the front wall 128 the printing substance dispensing nozzle 110 and the internal face 120 of the valve body 108. A portion of the gap encompassing the orifice wall 130 may be occupied by a dispensing-side gasket material 132.

The dispensing-side gasket material 132 may be a flexible, pliable, and/or compressible material. The dispensing-side gasket material 132 made be an absorbent material. The dispensing-side gasket material 132 may be a material that will accommodate the embedding of a printing material in its surface. For example, the dispensing-side gasket material 132 may be made up of a felt material, a closed-cell foam material, a solid rubber material, etc, and/or combinations thereof.

The dispensing-side gasket material 132 may be fixed to the external surface of the front wall 128 of the printing substance dispensing nozzle 110. For example, the dispensing-side gasket material 132 may be adhered to the front wall 128 of the printing substance dispensing nozzle 110 with an adhesive compound. As such, the dispensing-side gasket material 132 may rotate within the valve body 108 along with the rotation of the printing substance dispensing nozzle 110 within the valve body 108.

The dispensing-side gasket material 132 may fill the gaps created by the recessed front wall 128 of the printing substance dispensing nozzle 110. For example, the dispensing-side gasket material 132 may span the recess between the front wall 128 of the printing substance dispensing nozzle 110 and the internal face 120 of the valve body 108. The dispensing-side gasket material 132 may contact the internal face 120 of the valve body 108. As such, the dispensing-side gasket material 132 may slide against the internal face 120 of the valve body 108 as the printing substance dispensing nozzle 110 is rotated within the valve body 108.

The dispensing-side gasket material 132 may form a seal around the orifice wall 130. For example, the orifice 126 may be blocked by the internal face 120 of the valve body 108 when the print substance dispensing nozzle 110 is situated within the valve body 108 in the sealed orientation illustrated in FIG. 1. The orifice wall 130 may contact the internal face 120 of the valve body 108 creating a seal around the orifice 126. However, the orifice wall 130 may be made up of a material, such as a thermoplastic polymer, that is relatively more rigid than the dispensing-side gasket material 132. As such, the orifice wall 130 may be unable to deform and/or conform to the internal face 120 of the valve body 108 to create an air-tight seal around the orifice 126.

However, the dispensing-side gasket material 132 may surround the orifice wall 130 and conform to the space between the internal face 120 of the valve body 108 and the external surface of the front wall 128 of the printing substance dispensing nozzle 110. As such, the dispensing-side gasket material 132 may form a substantially air-tight seal around the orifice 126 when the orifice 126 is facing the internal face 120 of the valve body 108. The dispensing-side gasket material 132 may, therefore, prevent the leaking of a printing substance from the orifice 126 of the print substance dispensing nozzle 110 when in the sealed configuration. Additionally, dispensing-side gasket material 132 may prevent the introduction of environmental contaminants to the printing substance through the printing substance dispensing nozzle 110 when in the sealed configuration.

As described above, the dispensing-side gasket material 132 may be fixed to an external surface of the front wall 128 of the printing substance dispensing nozzle 110. Accordingly, the dispensing-side gasket material 132 may be rotatable along with printing substance dispensing nozzle 110. During rotation within the cavity of the valve body 108, the dispensing-side gasket material 132 may not only operate as a seal but may also operate as a wiping or cleaning mechanism. For example, the dispensing-side gasket material 132 may sweep excess printing substance that has escaped the orifice 126 and/or been deposited along the internal face 120 of the valve body 108, off the internal face 120 of the valve body 108. In some examples, the dispensing-side gasket material 132 may absorb or otherwise collect excess printing substance that has escaped the orifice 126 and/or has been deposited along the internal face 120 of the valve body 108.

As described above, the internal face 120 of the valve body 108 and the external surface of the front wall 128 may have complementary curved geometries. The dispensing-side gasket material 132 fixed to the external surface of the front wall 128 may conform to the shape of the external surface of the front wall 128. As such, the dispensing-side gasket material 132 may have a curved geometry that is complementary to the curved geometry of the internal face 120 of the valve body 108.

Therefore, the dispensing-side gasket material 132 may maintain contact with the internal face 120 of the valve body 108 during rotation of the printing substance dispensing nozzle 110, Likewise, the complementary geometries of the internal face 120 of the valve body 108 and the external surface of the front wall 128 may maintain contact between the internal face 120 of the valve body 108 and the orifice wall 130 during rotation of the printing substance dispensing nozzle 110.

Instead of continuing the curvature of the internal face 120 of the valve body 108 to the internal face of a sidewall 112, the internal face of the sidewall may be substantially planar and/or flat. The substantially planar, flat, and perpendicular sidewalls of the valve body 108 may be manufactured for a lower cost than continuing the curvature of the internal face 120 of the valve body 108. But more than that, confining the curvature to the internal face 120 of the valve body 108 may confine the points of contact to be maintained in order to preserve the seal to a single confined internal surface of the valve body 108.

As described above, the device 100 and the components thereof may be configured to operate as a dispensing-side mating interface 101. The dispensing-side mating interface 101 may be utilized to mate the printing substance dispensing container 102 with a receiving-side mating interface of a print substance receiving container.

For example, the device 100 may include an inlet port door engaging member 134. The engagement between the inlet port door engaging member 134 and the receiving-side mating interface will be discussed in greater detail with references to the figures below. The inlet port door engaging member 134 may include an extension from the external face 118 of the front wall 116 of the valve body 108. The inlet port door engaging member 134 may include an overhang or recess 136 between a bottom surface of the inlet port door engaging member 134 and a surface of the valve body 108 that is coplanar with the printing substance transfer window 122. The recess 136 may extend from a leading surface of the inlet port door engaging member 134 to a portion of the external face 118 of the front wall 116 of the valve body 108 immediately adjacent to the print substance transfer window 122.

The device 100 may also include an engagement slot 138. The engagement slot 138 may include a recess with a complementary geometry to a portion of a receiving-side interface. The engagement slot 138 may be defined by an engagement slot wall 140 and a portion of the front wall 116 of the valve body 108 extending below the inlet port door engaging member 134. As described in greater detail with regard to the figures below, a receiving-side interface may fit within the engagement slot 138.

The engagement slot 138 may simultaneously engage opposing faces of a receiving-side mating interface. For example, the engagement slot 138 may engage a first face of the receiving-side mating interface with the portion of the external face 118 of the front wall 116 defining the upper wall of the engagement slot 138. The engagement slot 138 may engage a second face of the receiving-side mating interface by an internal face 142 of the engagement slot wall 140. The engagement slot wall 140 may act as a stop for a receiving-side mating interface when mating to the dispensing-side mating interface 101. The engagement slot wall 140 may also stabilize the device 100 the device during mating and operation by encompassing and/or maintaining contact with multiple faces of the receiving-side mating interface.

As described above, the printing substance dispensing nozzle 110 may be rotatable within the valve body 108 about a rotational axis. As such, the printing substance dispensing nozzle 110 may be rotatable within the valve body 108 between a plurality of orientations. That is, the printing substance dispensing nozzle 110 may be able to be rotated into a variety of orientations with respect to the valve body 108 and/or with respect to the printing substance transfer window 122.

For example, the printing substance dispensing nozzle 110 may be rotatable between a first orientation and a second orientation. The first orientation may be a sealed orientation and the second orientation may be a dispensing orientation.

A sealed orientation may include the orientation illustrated in FIG. 1. For example, a sealed orientation may include an orientation where the orifice 126 of the printing substance dispensing nozzle 110 is facing an internal face 120 of the valve body 108.

In contrast, the dispensing orientation may include an orientation where the orifice 126 of the print substance dispensing nozzle 110 is facing the printing substance transfer window 122. In the dispensing orientation, a printing substance may be dispensed from the orifice 126 out of the valve body 108 through the printing substance transfer window 122. The dispensing-side gasket material 132 may be slide-able against the internal face 120 of the valve body 108 when rotating the print substance dispensing nozzle 110 between the dispensing orientation and the sealed orientation.

The device 100 may include a locking rod channel 144. The printing substance dispensing nozzle 110 may include a pair of parallel sidewalls having substantially planar and/or flat external surfaces. The nozzle channel 124 may extend through the parallel side walls. The locking rod channel 144 may include a channel through the pair of external faces of the parallel sidewalls of the printing substance dispensing nozzle 110. The locking rod channel 144 may be a continuous channel spanning continuously through the body of the printing substance dispensing nozzle 110 from one external face of a sidewall to the opposing external face of the opposing sidewall. However, the locking rod channel 144 may remain separate from the nozzle channel 124. That is, the locking rod channel 144 may not intersect the nozzle channel 124.

The locking rod channel 144 may be dimensioned to accommodate a locking rod passing through the locking rod channel 144. The locking rod channel 144 may include a first portion 149 and a second portion 148. The first portion 149 of the locking rod channel 144 may include a portion of the locking rod channel 144 to engage a locking rod within the locking rod channel 144 to lock the printing substance dispensing nozzle 110 in the dispensing orientation. The first portion 149 of the locking rod channel 144 may be dimensioned to block side-to-side movement of the locking rod channel 144 relative to the locking rod when the locking rod is being moved up or down within the first portion 149 of the locking rod channel 144.

The second portion 148 of the locking rod channel 144 may include a portion of the locking rod channel 144 to allow the locking rod to disengage from the first portion 149 and to free the printing substance dispensing nozzle 110 to be rotated to the dispensing orientation. The second portion 148 of the locking rod channel 144 may be dimensioned to block up and down movement of a locking rod during a side-to-side movement of the locking rod channel 144 relative to the locking rod within the second portion 148 of the locking rod channel 144.

In addition to the locking rod channel 144, the device 100 may include a locking rod window 146. The locking rod window 146 may include a window into the cavity of the valve body 108 through each external face of the pair of external faces of the sidewalls of the valve body 108. The locking rod window 146 may accommodate the passage of a locking rod through the valve body 108 and into the locking rod channel 144.

The locking rod window 146 may be dimensioned to accommodate a movement of a locking rod within the locking rod window 146. For example, the locking rod window 146 may be dimensioned to accommodate a movement of a locking rod between a first locked position and a second unlocked position within the locking rod window 146. For example, the locking rod window 146 may accommodate an up-and-down movement of a locking rod within the locking rod window 146. The locking rod may be in a locked position when it is located in a bottom portion of the locking rod window 146. The locking rod may be in an unlocked position when it is located in an upper portion of the locking rod window 146.

The locking rod may keep the printing substance dispensing nozzle 110 locked in the sealed orientation until the dispensing-side mating interface 101 is fully engaged with a receiving-side mating interface. For example, the locking rod may keep the printing substance dispensing nozzle 110 locked in the sealed orientation until the dispensing-side mating interface 101 has been slid into position over a receiving-side mating interface such that the printing substance transfer window 122 and/or the orifice 126 is aligned over the inlet port.

Figure 2:
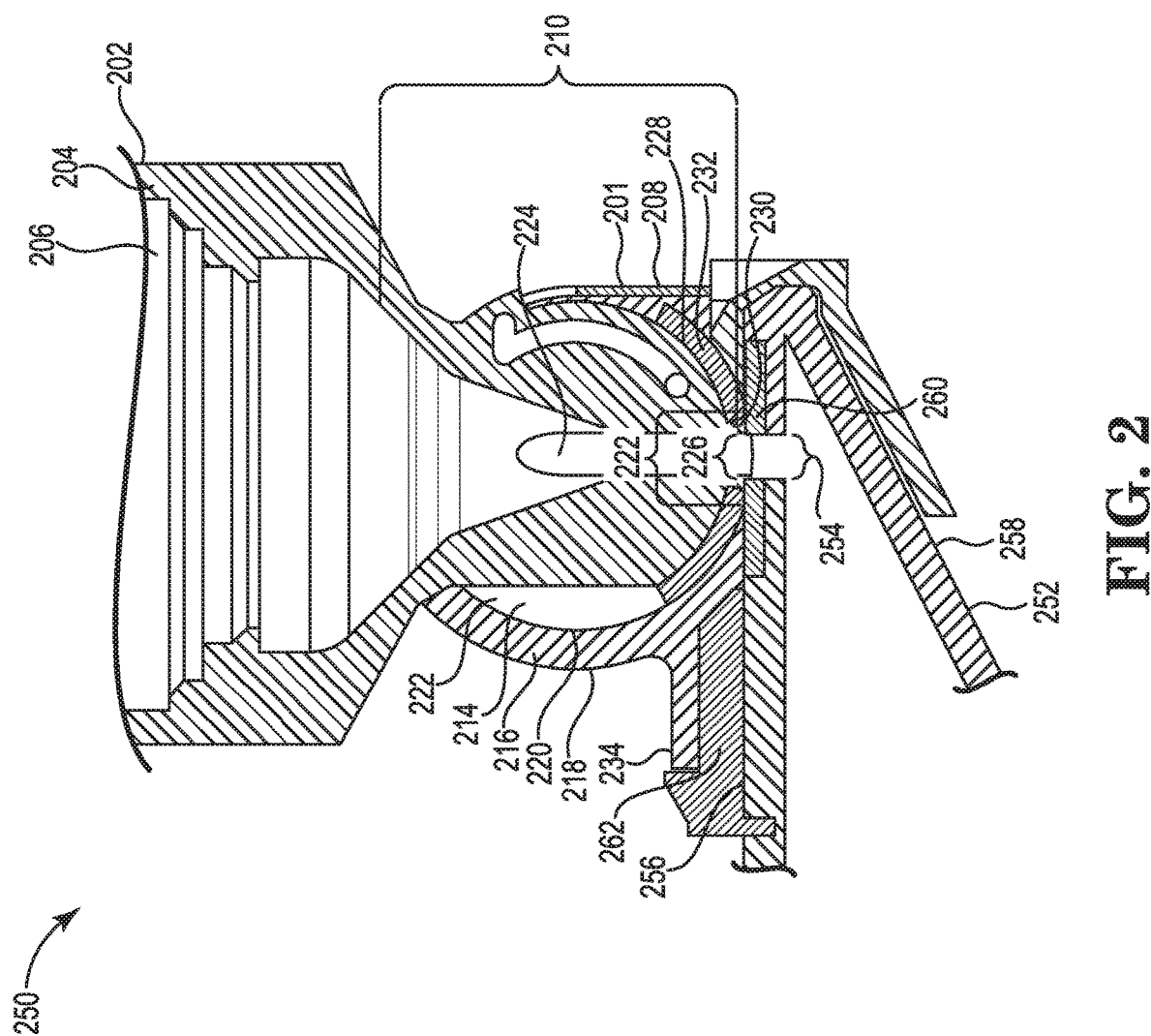
FIG. 2 illustrates a cross-sectional view of an example of a device, with a lockable printing substance dispensing nozzle, in a dispensing orientation consistent with the disclosure.

FIG. 2 illustrates a cross-sectional view of an example of a device 250, with a lockable printing substance dispensing nozzle 210, in a dispensing orientation consistent with the disclosure. The device 250 may include dispensing-side mating interface 201.

The dispensing-side mating interface 201 may include a valve body 208. The valve body 208 may include a pair of sidewalls, such as sidewall 212. The sidewalls may each include an internal face 214 that is substantially planar and/or flat. The valve body 208 may include a front wall 216 that spans between the sidewalls of the valve body 208. The front wall 216 may include an external face 218 and an internal face 220. The internal face 220 may be a curved face. The internal face 220 of the front wall 216 and the internal faces of the parallel sidewalls of the valve body 208 may define a cavity within the valve body 208.

A printing substance dispensing nozzle 210 may be fixed within the cavity of the valve body 208. That is, the print substance dispensing nozzle 210 may be attached to the valve body 208 such that the valve body prevents removal of the print substance dispensing nozzle 210 from the cavity of the valve body 208. While being fixed with respect to withdrawal from the cavity of the valve body 208, the print substance dispensing nozzle 210 may be rotatable within the valve body 208 about a rotational axis running through the center of the sidewalls of the valve body 208 and through the cavity of the valve body 208.

The printing substance dispensing nozzle 210 may include a nozzle channel 224. The nozzle channel 224 may be defined by an internal wall shaped to control the direction and/or characteristics of the flow of a printing substance from a printing substance dispensing container 202. The nozzle channel 224 and the internal walls of the print substance dispensing nozzle 210 may be contiguous with the channel 206 and/or the wall 204 of the printing substance dispensing container 202. The walls of the printing substance dispensing nozzle 210 may converge to an orifice 226. The orifice 226 may be encompassed and/or defined by an orifice wall 230. The orifice 226 in the printing substance dispensing nozzle 210 may be an opening through which a printing substance is dispensed from the channel 206 of the printing substance dispensing container 202.

The printing substance dispensing nozzle 210 may include a pair of parallel sidewalls with substantially planar and/or flat external surfaces. A front wall 228 of the printing substance dispensing nozzle 210, having a curved external surface, may span perpendicular to and in between the pair of parallel sidewalls of the printing substance dispensing nozzle 210. A dispensing-side gasket material 232 may be fixed to the curved external surface of the front wall 228 of the printing substance dispensing nozzle 210. The orifice wall 230 may protrude through and/or be surrounded by the dispensing-side gasket material 232.

The dispensing-side mating interface 201 may include a printing substance transfer window 222, The printing substance transfer window 222 may extend through the front wall 216 of the valve body 208. As described above, the printing substance dispensing nozzle 210 may be rotatable between a sealed orientation and a dispensing orientation within the valve body 208.

A dispensing orientation may include the orientation illustrated in FIG. 2, For example, a dispensing orientation may include an orientation where the orifice 226 of the printing substance dispensing nozzle 210 is facing through the printing substance transfer window 222. The orifice 226, the orifice wall 230, and/or a portion of the dispensing-side gasket material 232 may protrude through the printing substance transfer window 222. The printing substance dispensing nozzle 210 may dispense printing substance from the orifice 226 through the print substance transfer window 222 when the two are aligned.

The device 250 may include a receiving-side mating interface 252. The receiving-side mating interface 252 may include a first face 256 and a second face 258 opposing the first face 256. The receiving-side mating interface 252 may include a printing substance inlet port 254. The printing substance inlet port 254 may include a port through a first face 256 of the receiving-side mating interface 252. The printing substance inlet port 254 may be recessed with respect to the first face 256. The receiving-side mating interface 252 may include a receiving-side gasket material 260. The receiving-side gasket material 260 may encompass the printing substance inlet port 254 about its periphery.

The receiving-side mating interface 252 may be contiguous with a printing substance receiving container. The receiving container may include a container, such as a printing substance supply cartridge, of a printing device that may serve as a reservoir for the printing substance until a time when the printing substance is to be utilized by the printing device to perform a printing operation. The receiving-side mating interface 252 may be filled by receiving a printing substance from the printing substance dispensing nozzle 210 through the inlet port 254.

The receiving-side mating interface 252 may include an inlet port door 262. The inlet port door 262 may be slide-able along the first face 256. For example, the inlet port door 262 may be slide-able above the printing substance inlet port 254 to cover or uncover the printing substance inlet port 254. For example, the inlet port door 262 may be biased by a spring to close over the printing substance inlet port 254 and/or the receiving-side gasket material 260 encompassing the printing substance inlet port 254.

The inlet port door engaging member 234 of the dispensing-side mating interface 201 may engage the inlet port door 262. For example, the inlet port door engaging member 234 may engage the inlet port door 262 as the dispensing-side mating interface 201 is engaged with the receiving side mating interface 252. As the dispensing-side mating interface 201 is moved over the receiving side mating interface 252 the print substance transfer window 222 may be aligned over the printing substance inlet port 254. Further, the inlet port door engaging member 234 may push the inlet port door 262 away from the printing substance inlet port 254 and/or the receiving-side gasket material 260 encompassing the printing substance inlet port 254. Pushing inlet port door away may expose the printing substance inlet port 254 and/or the receiving-side gasket material 260 encompassing the printing substance inlet port 254.

The receiving-side gasket material 260 may be a flexible, pliable, and/or compressible material. For example, the receiving-side gasket material 260 may be an absorbent material. The receiving-side gasket material 260 may be a material that will accommodate the embedding of a printing material in its surface. For example, the receiving-side gasket material 260 may be made up of a felt material, a closed-cell foam material, a solid rubber material, etc. and/or combinations thereof.

When the device 250 is in a dispensing orientation, the dispensing-side gasket material 232 may protrude through the printing substance transfer window 222 and contact the receiving-side gasket material 260. The dispensing-side gasket material 232 and the receiving-side gasket material 260 may contact one another. The contact may form a seal around the orifice 226 and/or the printing substance inlet port 254.

Further, when the printing substance dispensing nozzle 210 is rotated between the dispensing orientation and the sealed orientation, the dispensing-side gasket material 232 may wipe against the receiving-side gasket material 260. As such, excess printing substance and/or environmental contaminants may be swept away, embedded, absorbed, etc. by the surface of the dispensing-side gasket material 232 and/or the receiving-side gasket material 260 during the rotation of the print substance dispensing nozzle 210 within the cavity of the valve body 208.

Figure 3:
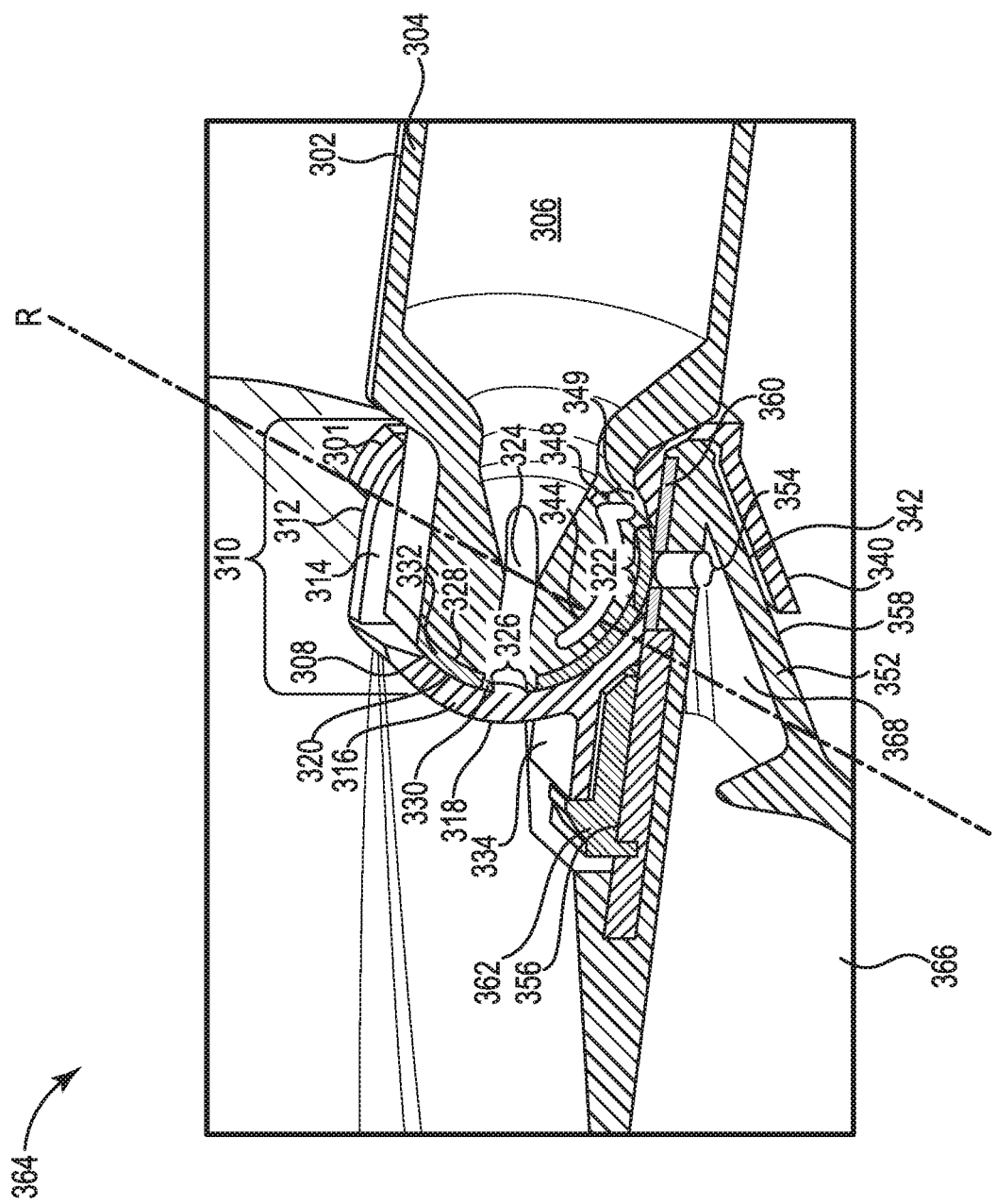
FIG. 3 illustrates a cross-sectional view of an example of a mating system for lockable printing substance dispensing nozzles consistent with the disclosure.

FIG. 3 illustrates a cross-sectional view of an example of a mating system 364 for lockable printing substance dispensing nozzles 310 consistent with the disclosure. The system 364 may include dispensing-side mating interface 301 configured to be mated to a receiving-side mating interface 352.

The dispensing-side mating interface 301 may be an interface of a printing substance dispensing container 302. For example, the print substance dispensing container 302 may include a dispensing-side mating interface 301 portion. The dispensing-side mating interface 301 may be configured to be mated to a receiving-side mating interface 352.

The dispensing-side mating interface 301 may keep the print substance sealed within the dispensing-side mating interface 301/printing substance dispensing container 302. The dispensing-side mating interface 301 may engage with the receiving-side mating interface 352. The dispensing-side mating interface 301 may open the printing substance receiving container 366 to receive print substance through the receiving-side mating interface 352 during the engagement. The dispensing-side mating interface 301 may reseal the print substance within the dispensing-side mating interface 301/printing substance dispensing container 302 when the dispensing-side mating interface 301 is disengaged from the receiving-side mating interface 352.

The printing substance dispensing container 302 may include a wall 304 encompassing and/or defining a channel 306. In some examples, the printing substance dispensing container 302 may include a cylindrical channel 306. In some examples, the printing substance dispensing container 302 may be a reciprocating pump. For example, the printing substance dispensing container 302 may be utilized as a portion of a syringe mechanism for printing substance delivery.

The channel 306 of the printing substance dispensing container 302 may be contiguous with a nozzle channel 324 of a printing substance dispensing nozzle 310. For example, the channel 306 may taper from a first diameter to a second diameter, where the second diameter is a diameter of the nozzle channel 324 of the printing substance dispensing nozzle 310. The second diameter may be smaller than the first diameter.

The printing substance dispensing nozzle 310 may be contiguous with printing substance dispensing container 302. The printing substance dispensing nozzle 310 may be utilized to dispense printing substance from the printing substance dispensing container 302 into a printing substance receiving container 366. The printing substance dispensing nozzle 310 may direct the flow of a printing substance from the channel 306 of the printing substance dispensing container 302 through the nozzle channel 324 of the of the printing substance dispensing nozzle 310 and out the orifice 326 at an end of the nozzle channel 324.

The printing substance dispensing nozzle 310 may include a plurality of walls encompassing and/or defining the nozzle channel 324 and/or the orifice 326. For example, the printing substance dispensing nozzle 310 may include a pair of parallel sidewalls. The external faces of the pair of parallel sidewalls may run parallel to a longitudinal length of the nozzle channel 324. Each of the parallel sidewalls may include a substantially planar and/or flat external surface facing away from the nozzle channel 324. Additionally, each of the parallel sidewalls may include a cylindrical protrusion from an approximate center of its external surface.

In addition to the sidewalls, the printing substance dispensing nozzle 310 may include a font wall 328. The front wall 328 may include a curved external surface spanning between the sidewalls and encompassing and/or defining the orifice 326. That is, the orifice 326 may be an opening into the nozzle channel 324 through the front wall 328. The curved external surface of the front wall 328 of the printing substance dispensing nozzle 310 may be recessed with respect to the orifice 326. For example, an orifice wall 330 defining the orifice 326 may protrude outward perpendicular to the curved external surface of the front wall 328.

A dispensing-side gasket material 332 may be fixed to the curved external surface of the front wall 328. The dispensing-side gasket material 332 may span from the curved external surface of the front wall 328 to a terminus of the orifice wall 330 such that the plane of the external face of the dispensing-side gasket material 332 is substantially coplanar with plane of the orifice 326. That is, the dispensing-side gasket material 332 may entirely occupy the recess between the curved external surface of the front wall 328 and the orifice 326.

The dispensing-side mating interface 301 may include a valve body 308. The valve body 308 may include a plurality of walls defining a cavity. The print substance dispensing nozzle 310 may be contained within the cavity of the valve body 308, For example, the valve body 308 may include a pair of substantially parallel sidewalls, such as sidewall 312, separated from one another by a cavity. Each of the sidewalls may include an external surface and an internal surface, such as internal surface 314 of sidewall 312. The internal surface 314 of sidewall 312 of the valve body 308 may be a substantially planar and/or flat surface facing into the cavity of the valve body 308. The internal surface 314 of sidewall 312 of the valve body 308 may face toward and/or interface with the substantially planar and/or flat surface of the sidewall of the printing substance dispensing nozzle 310.

The valve body 308 may include a front wall 316 spanning between the sidewalls and about the periphery of the cavity of the valve body 308. The front wall 316 may include an external face 318 facing away from the cavity of the valve body 308. The front wall 316 may include an internal face 320 facing toward the cavity of the valve body 308. The internal face 320 may be a curved face to interface with the orifice 326, the orifice wall 330, and/or the dispensing-side gasket material 332.

The valve body 308 may include a printing substance transfer window 322. The printing substance transfer window 322 may include a window through the front wall 316 of the valve body 308. Printing substance may be transferred through the printing substance transfer window 322 to a receiving container 366.

For example, the printing substance dispensing nozzle 310 may be located within the cavity of the valve body 308. The printing substance dispensing nozzle 310 may be trapped within the cavity of the valve body 308, such as by a male-female connection between the valve body 308 and the printing substance dispensing nozzle 310. However, the printing substance dispensing nozzle 310 may be rotatable within the valve body 308 about a rotational axis R. The printing substance dispensing nozzle 310 may be rotatable within the valve body 308 between a first sealed orientation, with an orifice 326 of the printing substance dispensing nozzle 310 facing an internal face 320 of the valve body 308, and a second dispensing orientation, with the orifice 326 of the printing substance dispensing nozzle 310 facing out of the printing substance transfer window 322.

The printing substance dispensing nozzle 310 may also include a locking rod channel 344. The locking rod channel 344 may include a channel through the printing substance dispensing nozzle 310 from one sidewall to another. The locking rod channel 344 may be dimensioned to accommodate a locking rod passing through the locking rod channel 344.

The locking rod channel 344 may include a first portion 349 and a second portion 348. The first portion 349 of the locking rod channel 344 may include a portion of the locking rod channel 344 to engage a locking rod traveling through the channel to lock the printing substance dispensing nozzle 310 in a dispensing orientation. The first portion 349 of the locking rod channel 344 may be dimensioned to block sideways movement of the locking rod channel 344 relative to the locking rod when the locking rod is being moved up or down within the first portion 349 of the locking rod channel 344.

The second portion 348 of the locking rod channel 344 may include a portion of the locking rod channel 344 to allow the locking rod to disengage from the first portion 349 and to free the printing substance dispensing nozzle 310 to be rotated to a dispensing orientation. The second portion 348 of the locking rod channel 344 may be dimensioned to block up and down movement of a locking rod during sideways movement of the locking rod channel 344 relative to the locking rod within the second portion 348 of the locking rod channel 344.

As described above, the dispensing-side gasket material 332 may be attached to the curved external surface of the front wall 328 of the print substance dispensing nozzle 310. As such, the dispensing-side gasket material 332 may be slide-able against the internal face 320 of the valve body 308 when rotating the printing substance dispensing nozzle 310 within the valve body 308 between a sealed orientation and a dispensing orientation. The dispensing-side gasket material 332 may form a seal around the orifice 326 between the curved external surface of the front wall 328 of the print substance dispensing nozzle 310 and the curved internal wall 320 of the front wall 316 of the valve body 308. The seal may keep the print substance sealed within the channel 324 of the print substance dispensing nozzle 310 and/or may wipe print substance and environmental contaminants from the curved internal wall 320 of the front wall 316 of the valve body 308.

The mating system 364 may include a receiving container 366. The receiving container 366 may be a printing substance cartridge. The receiving container 366 may be a reservoir that stores the printing substance and/or supplies the print substance directly to the printing mechanism of a printing device during execution of a printing operation by the printing device. For example, the printing substance receiving container 366 may supply the printing substance directly to a printhead of a printing device.

The printing substance receiving container 366 may include a receiving-side mating interface 352. The receiving-side mating interface 352 may configured to be mated to a dispensing-side mating interface 301. The receiving-side mating interface 352 may be an interface of a printing substance receiving container 366. The receiving-side mating interface 352 may keep the print substance sealed within the receiving-side mating interface 352/printing substance receiving container 366, engage with the dispensing-side mating interface 301, free the dispensing-side mating interface 301 to open to dispense printing substance into the receiving-side mating interface 352 during the engagement, and/or reseal the printing substance within the receiving-side mating interface 352/printing substance receiving container 366 when the dispensing-side mating interface 301 is disengaged from the receiving-side mating interface 352.

The receiving-side mating interface 352 may include a plurality of walls. The plurality of walls may form a ledge such as a three-dimensional triangular protrusion from the print substance receiving container 366. The plurality of walls may define a cavity 368 within the receiving-side mating interface 352. Printing substance may be dispensed into and/or travel through the cavity 368 on its way into the printing substance receiving container 366.

A first external face 356 of the receiving-side mating interface 352 may face away from a cavity 368 of the receiving-side mating interface 352. The first external face 356 may be a face of the receiving-side mating interface 352 that faces toward the dispensing-side mating interface 301 during engagement between the dispensing-side mating interface 301 and the receiving-side mating interface 352. A portion of the first external face 356 may be recessed. The recessed portion may encompass and/or define a printing substance inlet port 354 into the cavity 368 of the receiving-side mating interface 352. The recessed portion may be occupied by a receiving-side gasket material 360, That is receiving-side gasket material 360 may fill in the recess and further encompass and/or define the printing substance inlet port 354.

A second external face 358 of the receiving-side mating interface 352 may oppose and/or run at a slant away from the first external face 356. The second external face 358 and the first external face 356 may form an angle and/or a geometry that is complementary to an engagement slot of the dispensing-side mating interface 301. The engagement slot 301 may be defined by an engagement slot wall 340 and a portion of the front wall 316 of the valve body 308. The receiving-side mating interface 352 may fit within the engagement slot, simultaneously contacting an internal face 342 of the engagement slot wall 340, the valve body 308, and/or the dispensing-side gasket material 332 of the dispensing-side mating interface 301. When docked within the engagement slot 301 an engagement between the dispensing-side mating interface 301 and the receiving-side mating interface 352 may be achieved that is stabilized against multiple planes of the receiving-side mating interface 352 and against multiple planes of the dispensing-side mating interface 301.

In addition, an inlet port door 362 may be slide-able along the first external face 356 of the receiving-side mating interface 352. For example, the inlet port door 362 may be slide-able along the first external face 356 of the receiving-side mating interface 352 over the printing substance inlet port 354. The inlet port door 362 may be biased in a direction to remain situated over the printing substance inlet port 354.

The inlet port door 362 may maintain a seal over the printing substance inlet port 354 when positioned over it.

When the dispensing-side mating interface 301 is brought into engagement with the receiving-side mating interface 352, an inlet port door engaging member 334 protruding from the external surface 318 of the front wall 316 of the valve body 308 may engage a raised portion of the inlet port door 362. The inlet port door engaging member 334 may push the inlet port door 362 away from the printing substance inlet port 354.

The dispensing-side gasket material 332 protruding through the printing substance transfer window may contact and/or wipe against the surface of the receiving-side gasket material 332. This contact and/or wiping may wipe errant print substance or contaminants from the receiving-side gasket material 332 and maintain a seal over the printing substance inlet port 354 while the dispensing-side mating interface 301 is brought into engagement with the receiving-side mating interface 352 and/or the print substance dispensing nozzle 310 is in a sealed orientation.

The dispensing-side mating interface 301 may retain the printing substance sealed within the dispensing-side mating interface 301/printing substance dispensing container 302 until the dispensing-side mating interface 301 is fully engaged with the receiving-side mating interface 352. For example, the dispensing-side mating interface 301 may retain the printing substance sealed within the dispensing-side mating interface 301/printing substance dispensing container 302 until the printing substance transfer window 322 of the dispensing-side mating interface 301 is fully aligned above the printing substance inlet port 354 of the receiving-side mating interface 352.

For example, the dispensing-side mating interface 301 may be reconfigurable to lock and unlock the rotation of the printing substance dispensing nozzle 310 based on the engagement of the dispensing-side mating interface 301 with the receiving-side mating interface 352. Prior to the dispensing-side mating interface 301 fully engaging with the receiving-side mating interface 352, the dispensing-side mating interface 301 may be in a first configuration. In the first configuration; the printing substance dispensing nozzle 310 may be locked out from rotation out of a sealed orientation.

For example, a locking rod may remain engaged with the first portion 349 of the locking rod channel 344, locking the printing substance dispensing nozzle 310 in a sealed orientation, until the dispensing-side mating interface 301 is fully engaged with the receiving-side mating interface 352. The dispensing-side mating interface 301 may be fully engaged with the receiving-side mating interface 352 when the print substance transfer window 322 is aligned with the inlet port 354 and/or the receiving-side mating interface 352 is docked within the engagement slot of the dispensing-side mating interface 301.

Further, once the dispensing-side mating interface 301 has fully engaged with the receiving-side mating interface 352 the configuration of the dispensing-side mating interface 301 may be altered to a second configuration. For example, engagement between the receiving-side mating interface 352 and the dispensing-side mating interface 301 may alter the configuration of the dispensing-side mating interface 301 to the second configuration. In the second configuration, the printing substance dispensing nozzle 310 may be unlocked to rotate to a dispensing orientation and dispense printing substance into the receiving-side mating interface 352.

For example, once the dispensing-side mating interface 301 is fully engaged with the receiving-side mating interface 352 the locking rod may be lifted into the second portion 348 of the locking rod channel 344 allowing the printing substance dispensing nozzle 310 to be rotated about rotational axis R into the dispensing orientation. Once in the dispensing orientation, the orifice 326 of the printing substance dispensing nozzle 310 may be aligned to face through the printing substance transfer window 322. Then, the printing substance may pass from the printing substance dispensing container 302, through the nozzle channel 324 of the printing substance dispensing nozzle 310, out of the orifice 326 of the printing substance dispensing nozzle 310, and into the receiving-side mating interface 352 through the printing substance inlet port 354 of the receiving-side mating interface 352.

Since the dispensing-side gasket material 332 may be fixed to and/or rotatable with the printing substance dispensing nozzle 310, the dispensing-side gasket material 332 may maintain contact with and wipe against the receiving-side gasket material 360 during rotation between orientations. This contact and wiping may keep both surfaces free from print substance and/or contaminants. Further, since the dispensing-side gasket material 332 surrounds the orifice 326, the receiving-side gasket material 360 surrounds the inlet port 354, and the two gasket materials may maintain contact through the print substance transfer window 322, a seal around the orifice 326-to-inlet port 354 connection may be maintained between the two by the contacting gasket materials.

Furthermore, once dispensing is finished, the printing substance dispensing nozzle 310 may be rotated back to a sealed orientation. Once in the sealed orientation, the dispensing-side mating interface 301 may be disengaged from the receiving-side mating interface 352. Disengaging the dispensing-side mating interface 301 from the receiving-side mating interface 352 may return the dispensing-side mating interface 301 to the first configuration. As such, the printing substance dispensing nozzle 310 may be relocked back into the sealed orientation.

Figure 4:
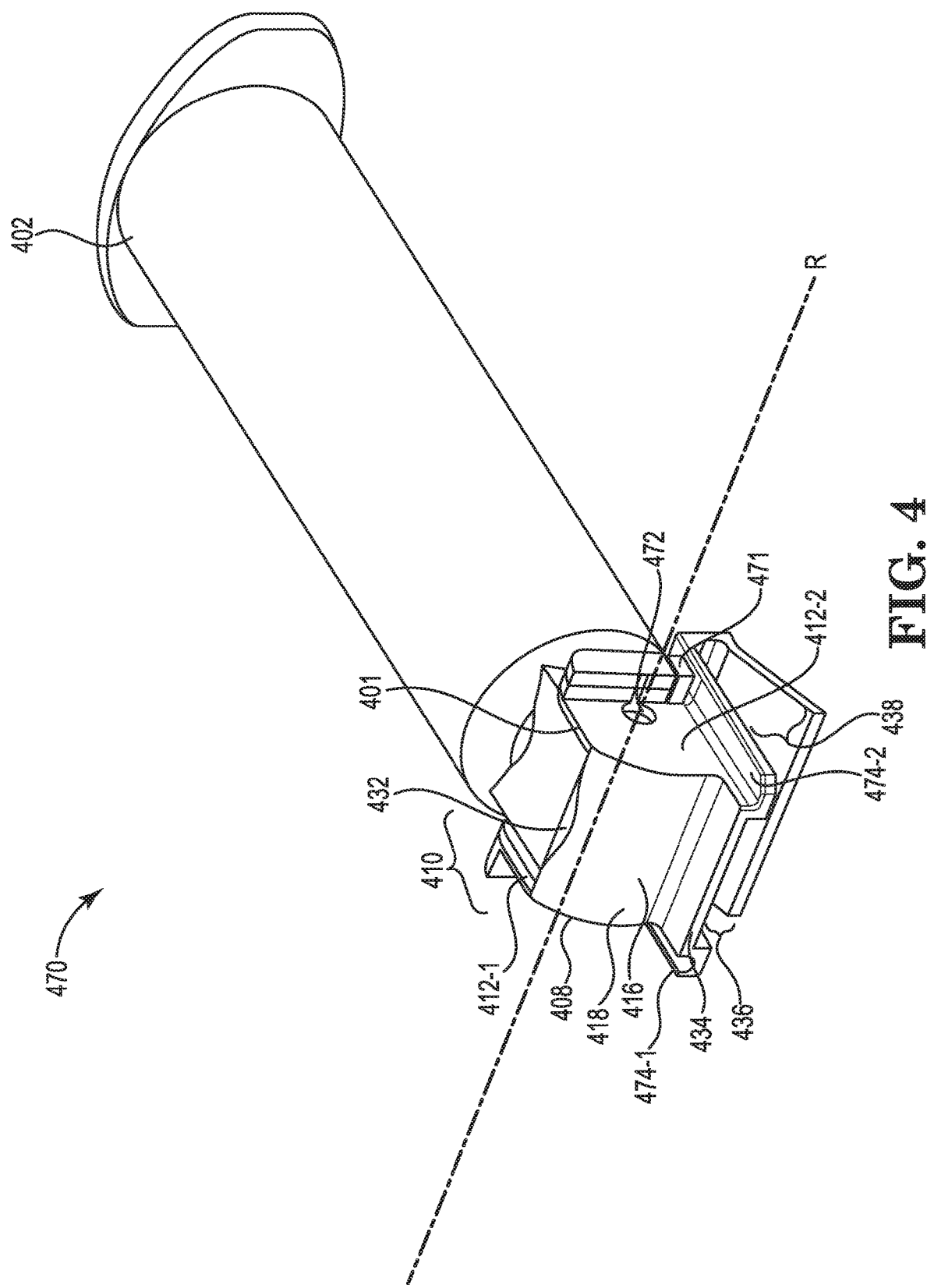
FIG. 4 illustrates an example of a device, with a lockable printing substance dispensing nozzle, consistent with the disclosure.

FIG. 4 illustrates an example of a device 470 with a with a lockable printing substance dispensing nozzle 410 consistent with the disclosure. The device 470 may include a dispensing-side mating interface 401. For example, the device 470 may include a printing substance dispensing container 402. The printing substance dispensing container 402 may include a printing substance reservoir within a cylindrical body. The printing substance dispensing container 402 may be configured to operate as a reciprocating pump. For example, the printing substance dispensing container 402 may include a piston to travel within the channel of the dispensing container 402. The piston travel within the channel may cause a printing substance to be expelled from an orifice of a printing substance dispensing nozzle 410 in fluid communication with the channel of the dispensing container 402.

The device 470 may include a printing substance dispensing nozzle 410. The printing substance dispensing nozzle 410 may be fit within a cavity of a valve body 408. For example, the sidewall of the printing substance dispensing nozzle 410 may include a protrusion from its center portion. The protrusion may engage within a complementary shaped recess and/or window 472 in a sidewall 412-1 . . . 412-2 of the valve body 408.

The protrusions from the sidewall of the printing substance dispensing nozzle 410 may be rotatable within the window 472. Therefore, the printing substance dispensing nozzle 410 may rotate within the valve body 408 about a rotational axis R. The rotational axis R may pass through the center of the protrusion and the center of the window 472. The printing substance dispensing nozzle 410 and, therefore, the printing substance dispensing container 402 may be rotatable between a sealed orientation (illustrated in FIG. 4) and a dispensing orientation (illustrated, for example, in FIG. 2). In the dispensing orientation, the printing substance dispensing nozzle 410 and/or the printing substance dispensing container 402 may be rotated about the rotational axis R to a position ninety-degrees apart from its position in the sealed orientation.

The device 470 may include a locking rod 471. The locking rod 471 may include a rod that passes through a locking rod window through the valve body 408. The locking rod 471 may also pass through a locking rod channel of the printing substance dispensing nozzle 410. The locking rod 471 may protrude outside of the sidewalls 412-1 . . . 412-2 of the valve body 408.

The device 470 may include an inlet port door engaging member 434. The inlet port door engaging member 434 may protrude from the external face 418 of the front wall 416 of the valve body 408. The inlet port door engaging member 434 may include a recess 436. The recess 436 may be formed under a ceiling wall and between two sidewalls of the port door engaging member 434. The inlet port door engaging member 434 may engage and move an inlet port door on a receiving-side mating interface of a printing substance receiving container. The recess 436 may house the inlet port door during its movement by the inlet port door engaging member 434.

The device 470 may include a pair of guide members 474-1 . . . 474-2. The guide members 474-1 . . . 474-N may include fins protruding perpendicularly from the sidewalls of the inlet port door engaging member 434. The guide members 474-1 . . . 474-N may be dimensioned to engage with and slide within a channel in a receiving-side mating interface of a print substance receiving container. For example, the guide members 474-1 . . . 474-N may slide within the channel in the receiving-side mating interface during mating in order to maintain an engagement between the dispensing-side mating interface 401 and a receiving side mating interface.

Additionally, the device 470 may include a receiving-side mating interface engagement slot 438. The receiving-side mating interface engagement slot 438 may extend below a bottom face of the front wall 416 of the valve body 408. The receiving-side mating interface engagement slot 438 may be dimensioned to simultaneously engage opposing faces of a receiving-side mating interface.

The device 470 may include a dispensing-side gasket material 432. The dispensing side gasket material 432 may be fixed to an external wall of the printing substance dispensing nozzle 410. The dispensing-side gasket material 432 may be rotatable with the printing substance dispensing nozzle 410. The dispensing-side gasket material 432 may contact and/or rotate in contact with an internal surface of the front wall 416, Additionally, the dispensing-side gasket material 432 may protrude through a printing substance transfer window through a portion of the front wall 416 below the inlet port door engaging member 434. The dispensing-side gasket material 432 may protrude through a printing substance transfer window in both a sealed orientation and a dispensing orientation and be slide-able through the printing substance transfer window when rotating between the two orientations.

FIGS. 5A and 5B illustrate an example of a device 580, mate-able with a lockable printing substance dispensing nozzle, consistent with the disclosure. FIG. 5A illustrates the device 580 in a closed orientation. FIG. 5B illustrates the device 580, in an open orientation. The device 580 may be a device 580 for mating to a dispensing-side mating interface.

The device 580 may include a receiving-side mating interface 552. The receiving-side mating interface 552 may include an inlet port door 562. The inlet port door 562 may cover a printing substance inlet port 554 when in the closed position illustrated in FIG. 5A. The inlet port door 562 may be biased, such as by a spring mechanism, to the closed position resting over the printing substance inlet port 554.

The inlet port door 562 may be slide-able along a first face 556 of the receiving-side mating interface 552 between the open and closed positions. For example, the application of a force to a portion of the inlet port door 562 greater than the above-mentioned biasing force may cause the inlet port door 562 to slide along the first face 556 away from the printing substance inlet port 554. As a result, the printing substance inlet port 554 may be exposed.

The receiving-side gasket material 560 may encompass the printing substance inlet port 554. For example, the receiving-side gasket material 560 may be fixed into a recess in the first face 556 of the receiving-side mating interface 552 around the printing substance inlet port 554.

The receiving-side mating interface 552 may include a plurality of ramps 582-1 . . . 582-2. Each ramp 582-1 . . . 582-2 may include a sloped channel in a sidewall of the receiving-side mating interface 552. The sloped channel may ascend from the first face 556 of the receiving-side mating interface 552 as it extends back along the first face 556.

Each ramp 582-1 . . . 582-2 may be dimensioned to engage and/or lift a locking rod in a dispensing-side mating interface. For example, as the dispensing-side mating interface is mated to the receiving-side mating interface 552 the locking rod of the dispensing-side mating interface may be forced up the slope of the ramp 582-1 . . . 582-2.

Each ramp 582-1 . . . 582-2 may include a catch 584-1 . . . 584-2. The catch 584-1 . . . 584-2 may be located at or near a top portion of the ramp 582-1 . . . 582-2. The catch 584-1 . . . 584-2 may catch the locking rod of the dispensing-side mating interface. For example, when the dispensing-side mating interface is fully engaged with the receiving-side mating interface 552 and the printing substance dispensing nozzle 410 is freed to rotate to a dispensing orientation, the locking rod may be engaged with the catch 584-1 . . . 584-2. When engaged with the catch 584-1 . . . 584-2 the locking rod may be blocked from descending back down the ramp 582-1 . . . 582-N. For example, when the dispensing-side mating interface is fully engaged with the receiving-side mating interface 552 and the printing substance dispensing nozzle of the dispensing-side mating interface has begun to rotate to a dispensing orientation, the locking rod may be blocked from descending back down the ramp 582-1 . . . 582-N.

The receiving-side mating interface 552 may include a plurality of channels, such as channel 586. A channel 586 may span between the first face 556 of the receiving-side mating interface 552 and a ceiling overhanging a portion of the first face 556. The channel 586 may be dimensioned to engage guide members of the dispensing-side mating interface. For example, the guide members may slide within the complementary channel 586 over the first face 556 of the receiving-side mating interface 552. The channel 586 may guide alignment and maintain engagement between the dispensing-side mating interface and the receiving-side mating interface 552 during engagement therebetween.

FIGS. 6A, 6B, and 6C illustrate an example of a mating system 690 for lockable printing substance dispensing nozzles 610 consistent with the disclosure. FIGS. 6A, 6B, and 6C may collectively illustrate a sequence of operations associated with utilizing the mating system 690 to mate a dispensing-side mating interface 601 with a receiving-side mating interface 652. For example, FIGS. 6A-6B may illustrate a time-lapse of mating a dispensing-side mating interface 601 with a receiving-side mating interface 652, where the sequence may be performed as illustrated in FIG. 6A, then 6B, then 6C or as 6C, then 6B, then 6A.

In FIG. 6A the dispensing-side mating interface 601 and the receiving-side mating interface 652 are illustrated in a disengaged position. In the disengaged position the dispensing-side mating interface 601 and the receiving-side mating interface 652 may not be in contact and may be able to be moved in any direction independently from one another. In the disengaged position, the inlet port door 662 may be in a closed position over a printing substance inlet port into the receiving-side mating interface 652. Further, in the disengaged position, the printing substance dispensing nozzle may be locked in a sealed orientation within the valve body 608.

In FIG. 6B the dispensing-side mating interface 601 and the receiving-side mating interface 652 are illustrated in a partially engaged position. In the partially engaged position, the inlet port door engaging member 634 may be contacting the inlet port door 662. The inlet port door may be pushing against the inlet port door 662 with enough force to overcome a bias of the inlet port door 662 to a closed position. The guide member 674 of the dispensing-side mating interface 601 may be engaged within the complementary channel 686 of the receiving-side mating interface 652. The guide member 674 of the dispensing-side mating interface 601 may slide along the first face 656 of the receiving-side mating interface 652 within the complementary channel 686 of the receiving-side mating interface 652.

The engagement of the guide member 674 of the dispensing-side mating interface 601 within the complementary channel 686 may maintain alignment between the dispensing-side mating interface 601 and the receiving-side mating interface 652 during mating. Additionally, the engagement of guide member 674 of the dispensing-side mating interface 601 within the complementary channel 686 may prevent the dispensing-side mating interface 601 from being inadvertently lifted off and/or separated from the receiving-side mating interface 652 during mating.

In FIG. 6C the dispensing-side mating interface 601 and the receiving-side mating interface 652 are illustrated in a fully engaged position. In the fully engaged position, the inlet port door engaging member 634 may have pushed the inlet port door 662 away and clear of the printing substance inlet port through the receiving-side mating interface 652. In the fully engaged position, the guide member 674 of the dispensing-side mating interface 601 may be docked fully within the complementary channel 686. For example, the guide member 674 of the dispensing-side mating interface 601 may be resting against a stop in a back of the complementary channel 686.

In the fully engaged position, the locking rod 671 may be lifted up and away from the first surface 656. For example, the ramp 682 of the receiving-side mating interface 652 may direct the locking rod 671 away from the first surface 656 as the dispensing-side mating interface 601 is slid into engagement with the receiving-side mating interface 652. In the fully engaged position, the locking rod 671 may be engaged with the catch 684 of the ramp 682.

In the fully engaged position, the engagement slot wall 640 of the dispensing-side mating interface 601 may be in contact with a second face of the receiving-side mating interface 652. The contact between the engagement slot wall 640 and the second face of the receiving-side mating interface 652 may serve as a stop. For example, the engagement slot wall 640 may stop advancement of the dispensing-side mating interface 601 across the receiving-side mating interface 652 once a targeted alignment is achieved. The simultaneous contact of the dispensing-side mating interface 601 with opposing faces of the receiving-side mating interface 652 may prevent the dispensing-side mating interface 601 from being inadvertently lifted off and/or separated from the receiving-side mating interface 652 while the two are fully engaged.

In the fully engaged position, a printing substance transfer window of the dispensing-side mating interface 601 may be aligned with the printing substance inlet port of the receiving-side mating interface 652. That is, the printing substance transfer window of the dispensing-side mating interface 601 may be aligned over the printing substance inlet port of the receiving-side mating interface 652 such that a printing substance may be transferred through the printing substance transfer window and into the printing substance inlet port. Additionally, when in the fully engaged position, the printing substance dispensing nozzle 608 may be freed to rotate within the valve body 608. For example, the lifting action of the ramp 682 on the locking rod 671 may free the printing substance dispensing nozzle to rotate within the valve body 608.

Figure 7:
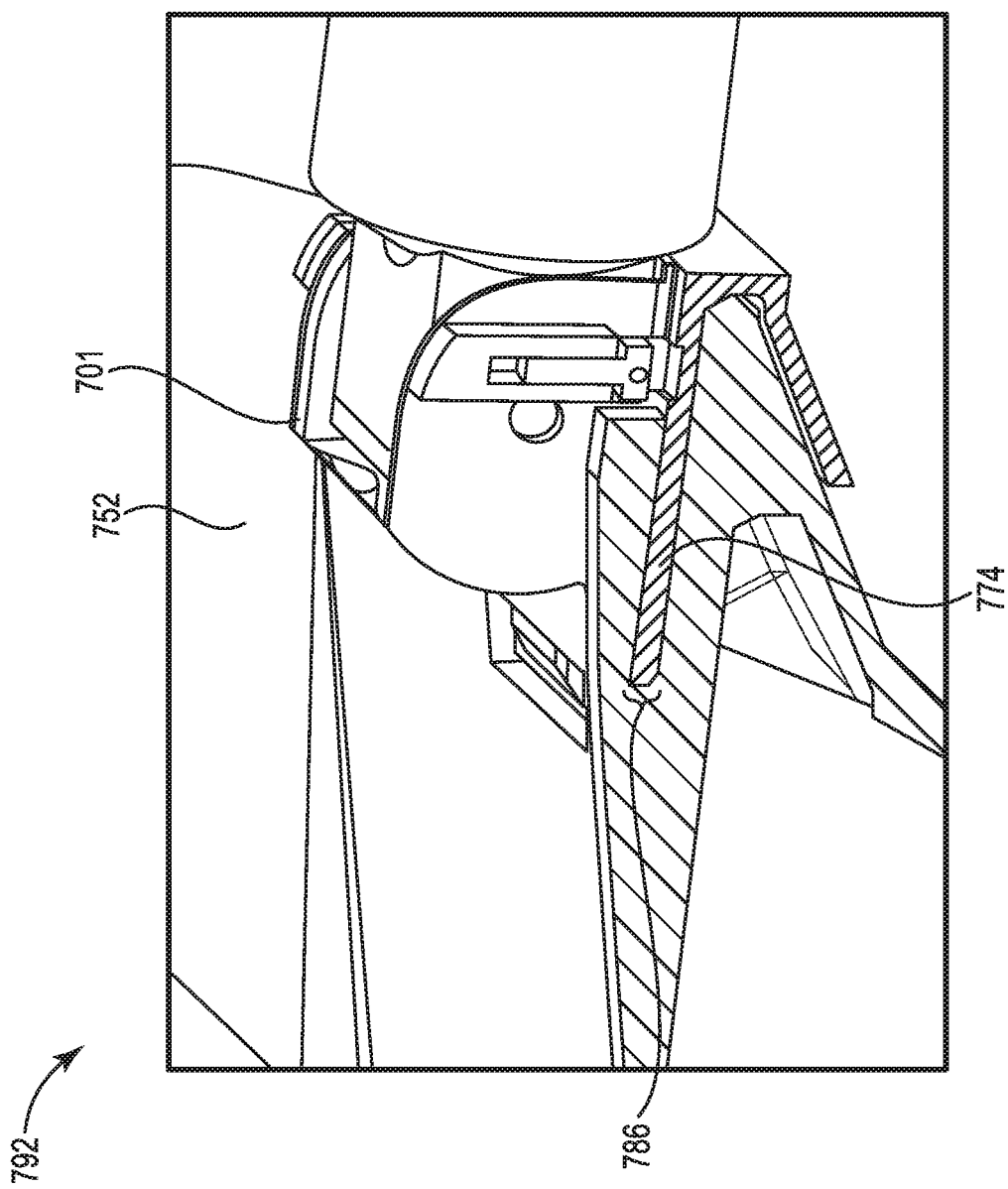
FIG. 7 illustrates a cross-sectional view of an example of a mating system, for lockable printing substance dispensing nozzles, consistent with the disclosure.

FIG. 7 illustrates a cross-sectional view of a mating system 792 for lockable printing substance dispensing nozzles consistent with the disclosure. The system 792 may include a dispensing-side mating interface 701 and the receiving-side mating interface 752 in a fully engaged position. The guide member 774 of the dispensing-side mating interface 701 is illustrated docked fully within the complementary channel 786 of the receiving-side mating interface 752. The guide member 774 of the dispensing-side mating interface 701 is in contact with a stop at the back of the complementary channel 786.

The complementary channel 786 may prevent the dispensing-side mating interface 701 from being lifted directly up and off of the receiving-side mating interface 752. The separation and/or mating of the receiving-side mating interface 752 and the dispensing-side mating interface 701 may be mechanically restricted by the complementary channel 786. For example, the receiving-side mating interface 752 and the dispensing-side mating interface 701 may be restricted to a sliding action of the guide member 774 of the dispensing-side mating interface 701 within the complementary channel 786 of the receiving-side mating interface 752.

Figure 8:
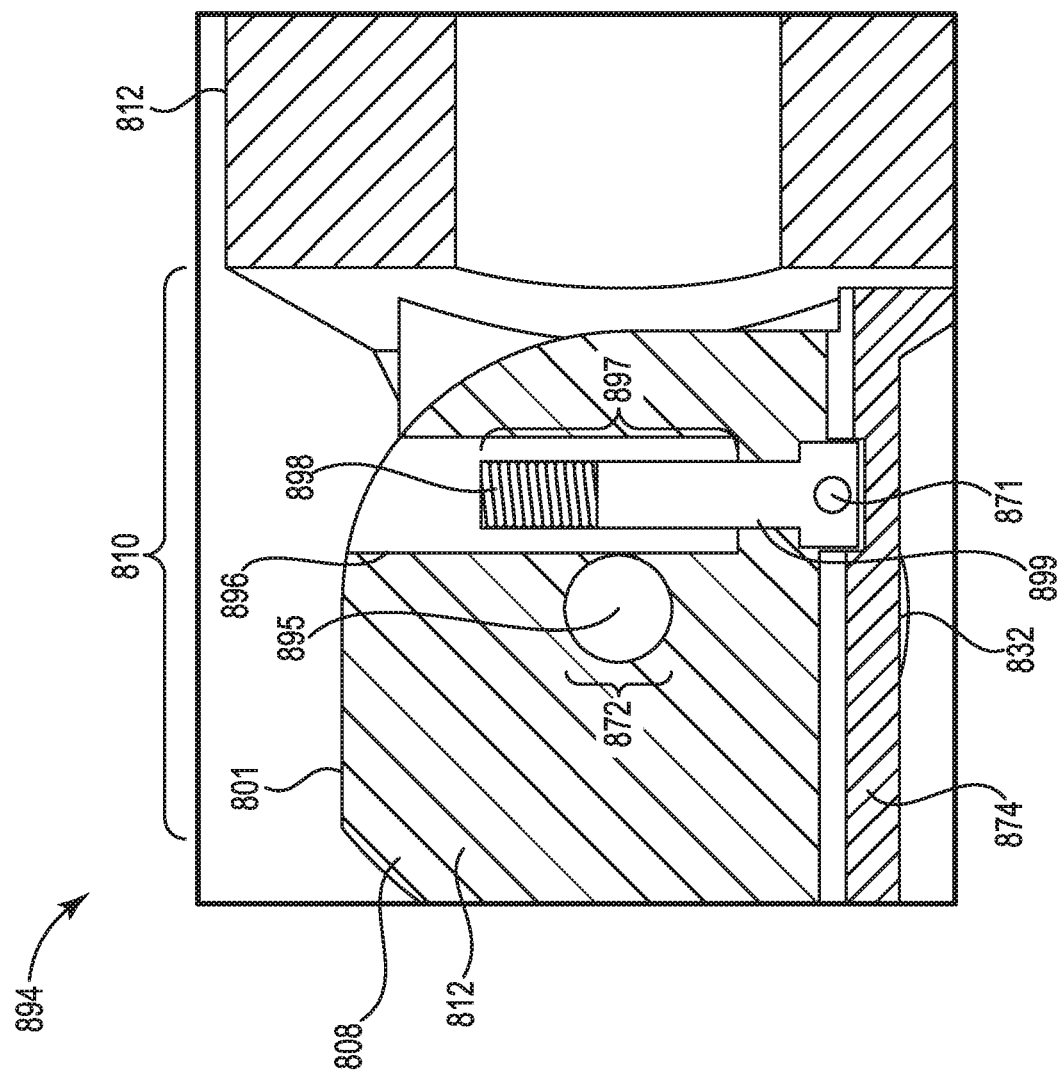
FIG. 8 illustrates a cross-section of an example of a device, with a lockable printing substance dispensing nozzle, consistent with the disclosure.

FIG. 8 illustrates a cross-section of a device 894, with a lockable printing substance dispensing nozzle 810, consistent with the disclosure. The device 894 may include a dispensing-side mating interface 801. The device 894 may include a printing substance dispensing nozzle 810 connected to a printing substance dispensing container 802.

The device 894 may include a valve body 808. The valve body 808 may include a plurality of walls. The plurality of walls may encompass and/or define a cavity inside of the valve body 808. A portion of the printing substance dispensing nozzle 810 may be located within the cavity of the valve body 808. The dispensing-side gasket material 832 may be fixed to the portion of the printing substance dispensing nozzle 810 within the cavity. A portion of the dispensing-side gasket material 832 may protrude through a printing substance transfer window through the valve body 808.

A portion of the printing substance dispensing nozzle 810 may be engaged with a complementary portion of the valve body 808. The engagement between the two may keep the portion of printing substance dispensing nozzle 810 within the valve body 808. For example, a cylindrical protrusion 895 from the face of a sidewall of the printing substance dispensing nozzle 810 within the valve body 808 may be engaged within and/or through a window 872 through a sidewall 812 of the valve body 808. The window 872 and/or the protrusion 895 may be dimensioned such that the protrusion 895 is rotatable within the window 872.

However, the engagement between the valve body 808 and the printing substance dispensing nozzle 810 is not limited to such a design. Various other mechanisms are contemplated. For example, cylindrical holes may be present in the face of a sidewall of the printing substance dispensing nozzle 810 within the valve body 808, In such examples, a retaining pin may pass through the window 872 and engage into the cylindrical holes. The retaining pin, in such examples, may be dimensioned such that it may be rotatable within the window 872.

Additionally, a locking pin housing 896 may protrude from the sidewall 812 of the valve body 808, The housing 896 may include a plurality of housing walls. The plurality of housing walls in combination with the sidewall 812 of the valve body 808 may encompass and/or define a cavity 897 within the locking pin housing 896.

The device 894 may include a locking pin 899. The locking pin 899 may be moveable within the cavity 897 of the locking pin housing 896. The locking pin 899 may travel within the cavity 897 of the locking pin housing 896 to seat the locking pin 899 at various depths within the locking pin housing 896.

The device 894 may include a locking rod 871. The locking rod 871 may be engaged within the locking pin 899, For example, the locking rod 871 may be engaged through a portion of the locking pin 899. The locking rod 871 may travel through the locking pin 899, through a window in the sidewall 812 of the valve body 808, and through a locking rod channel in the print substance dispensing nozzle 810. The locking rod 871 may protrude outside of the locking pin 899. The portion of the locking rod 871 protruding outside of the locking pin 899 may be engageable by a ramp on the receiving-side mating interface during mating.

The window in the sidewall 812 of the valve body 808 may be located behind the locking pin 899 in the view illustrated in FIG. 8. The window in the sidewall 812 of the valve body 808 may be dimensioned such that the locking rod 871 may move up and down within the window. The locking pin 899 may move up and down with the locking rod 871. The up and down movement of the locking rod 871 may cause the locking pin 899 to travel further into and/or out of the cavity 897 of the locking pin housing 896. That is, force applied to the locking rod 871 may be translated to movement of the locking pin 899 into and/or out of the locking pin housing 896, For example, engagement between the locking rod 871 and a ramp on the receiving-side mating interface may drive the locking rod 871 upward during mating. The upward force applied to the locking rod 871 may translate to the locking pin 899, causing the locking pin 899 to recede further into the cavity 897 of the locking pin housing 896.

The device 894 may include an urging member 898. The urging member 898 may include a spring. The urging member 898 may be contained within the cavity 897 of the locking pin housing 896. The urging member 898 may be compressible by the locking pin 899 as the locking pin 899 is pushed deeper into the locking pin housing 896. The urging member 898 may bias the locking pin 899 out of the cavity 897 of the locking pin housing 896. For example, the urging member 898 may bias the locking pin 899 against a guide member 874 of the dispensing-side mating device 801. As such, the guide member 874 may serve as a stop preventing the locking pin 899 from completely exiting the cavity 897 of the locking pin housing 896.

The biasing force of the urging member 898 exerted against the locking pin 899 may be translated to the locking rod 871 engaged with the locking pin 899. For example, the biasing force of the urging member 898 may bias the locking rod downward in the window through the sidewall 812 of the valve body 808 and downward in the locking rod channel through the printing substance dispensing nozzle 810.

Figure 9B:
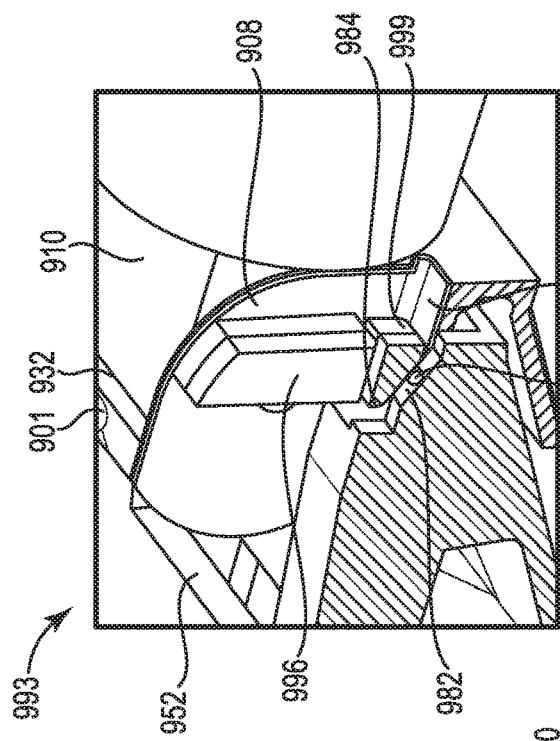
FIG. 9B illustrates a cross-sectional view of an example of a mating system, for lockable printing substance dispensing nozzles, in a mid-ramp engagement orientation consistent with the disclosure.
Figure 9C:
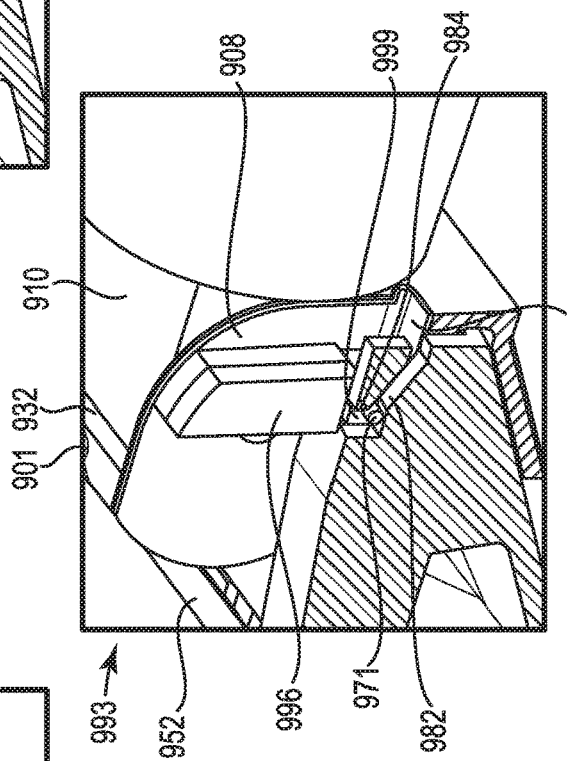
FIG. 9C illustrates a cross-sectional view of an example of a mating system, for lockable printing substance dispensing nozzles, in an upper ramp engagement orientation consistent with the disclosure.
Figure 9A:
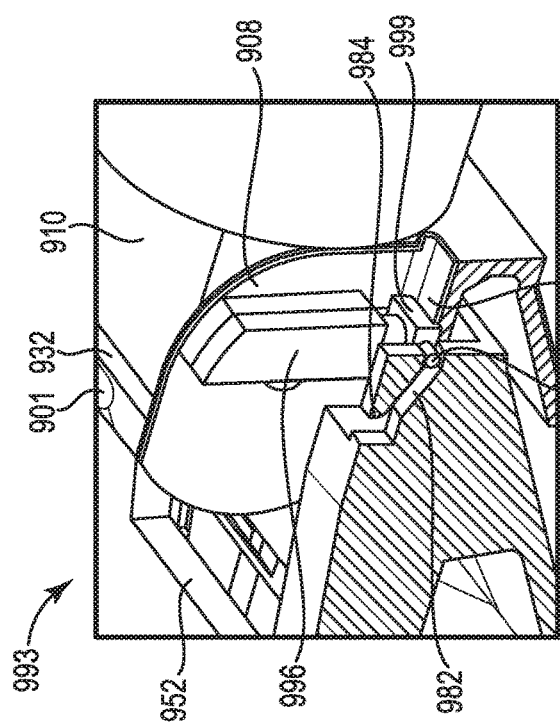
FIG. 9A illustrates a cross-sectional view of an example of a mating system, for lockable printing substance dispensing nozzles, in a lower ramp engagement orientation consistent with the disclosure.

FIGS. 9A, 9B, and 9C illustrate a cross-sectional view of an example of a mating system 993 for lockable printing substance dispensing nozzles 910 consistent with the disclosure. FIG. 9A illustrates a cross-sectional view of an example of a mating system 993, for lockable printing substance dispensing nozzles 910, in a lower ramp engagement orientation consistent with the disclosure. FIG. 9B illustrates a cross-sectional view of an example of a mating system 993, for lockable printing substance dispensing nozzles 910, in a mid-ramp engagement orientation consistent with the disclosure. FIG. 9C illustrates a cross-sectional view of an example of a mating system 993, for lockable printing substance dispensing nozzles 910, in an upper ramp engagement orientation consistent with the disclosure.

FIGS. 9A, 9B, and 9C may collectively illustrate a sequence of operations associated with utilizing the mating system 993 to actuate a locking mechanism by mating a dispensing-side mating interface 901 with a receiving-side mating interface 952. For example, FIGS. 9A-9B may illustrate a time-lapse of actuating a locking mechanism by mating a dispensing-side mating interface 901 with a receiving-side mating interface 952, where the sequence may be performed as illustrated in FIG. 9A, then 9B, then 9C or as 9C, then 9B, then 9A.

In FIG. 9A the dispensing-side mating interface 901 has engaged with the receiving-side mating interface 952 to an extent where the locking rod 971 has engaged the ramp 982 ascending from the surface of the receiving-side mating interface 952, The locking pin 999 may be positioned against the guide member 974 of the dispensing-side mating interface 901.

The locking rod 971 in FIG. 9A may be in a locked position. The locked position may correspond to the locking rod 971 being present in a first lower portion of the window through the valve body 908 of the dispensing-side mating interface 901. The locked position may correspond to the locking rod 971 being present in a first portion of the locking rod channel through the printing substance dispensing nozzle 910 that prevents the printing substance dispensing nozzle 910 from rotating within the valve body 908 of the dispensing-side mating interface 901.

In FIG. 9B, as the dispensing-side mating interface 901 is slid into further engagement with the receiving-side mating interface 952 the locking rod 971 begins to ascend the ramp 982. That is, the ramp 982 may translate the pushing force applied to slide the dispensing-side mating interface 901 into engagement with the receiving-side mating interface 952 into a lifting force on the locking rod 971. As the locking rod 971 is lifted by ascending the ramp 982, the locking pin 999 engaged with the locking rod 971 may be lifted against the bias of the urging member to travel further into the cavity of the locking pin housing 996. As described in greater detail below, the lifting of the locking rod 971 may move the locking rod 971 to an upper portion of a window through the valve body 908 of the dispensing-side mating interface 901.

Likewise, the lifting of the locking rod 971 may translate to movement of the locking rod 971 from the lower portion of the window through the valve body 908 of the dispensing-side mating interface 901 toward an upper portion of the window through the valve body 908 of the dispensing-side mating interface 901, In FIG. 9B the locking rod 971 may still be in a locked position but may be traveling toward an unlocked position. For example, the locking rod 971 may still be present in a first portion of the locking rod channel through the printing substance dispensing nozzle 910 that prevents the printing substance dispensing nozzle 910 from rotating within the valve body 908 of the dispensing-side mating interface 901, However, in FIG. 9B the locking rod 971 may be in the process of being lifted out of the first portion of the locking rod channel into a second portion of the locking rod channel. The second portion of the locking rod channel may no longer prevent the print-substance dispensing nozzle 910 from rotating within the valve body 908 of the dispensing-side mating interface 901.

In FIG. 9C, the dispensing-side mating interface 901 is illustrated fully engaged with the receiving-side mating interface 952. In FIG. 9C the locking rod 971 may be in an unlocked position. The unlocked position may correspond to the locking rod 971 being present at a top portion of a ramp 982. The locking rod 971 may be engaged with a catch 984 at the top of the ramp 982.

In the unlocked position, the locking rod 971 may be present in an upper portion of the window through the valve body 908 of the dispensing-side mating interface 901. In the unlocked position, the locking rod 971 may be present in a second portion of the locking rod channel through the printing substance dispensing nozzle 910, where it no longer prevents the printing substance dispensing nozzle 910 from rotating within the valve body 908 of the dispensing-side mating interface 901.

Although illustrated in the sealed orientation in FIG. 9C, when the locking rod 971 is in the unlocked position, the printing substance dispensing nozzle 910 may be in the sealed orientation, the dispensing orientation, and/or traveling between the two orientations. When in the sealed orientation, the dispensing-side gasket material 932 may be in contact with an internal surface of a front wall of the valve body 908 sealing around the orifice. Simultaneously, a portion of the dispensing-side gasket material 932 may be protruding through a printing substance transfer window through the valve body 908 and contacting a printing substance inlet port and/or a receiving-side gasket material of the receiving-side mating interface 952. This contact may establish and/or preserve a seal around the printing substance inlet port.

When in the dispensing orientation, the orifice of the printing substance dispensing nozzle 910 may be aligned with the printing substance inlet port through the printing substance transfer window. The dispensing-side gasket material 932 surrounding the orifice may be in contact with the receiving-side gasket material surrounding the printing substance inlet port. This contact may establish and/or preserve a seal around the orifice of the printing substance dispensing nozzle 910, the printing substance inlet port, and/or a transfer channel existing therebetween.

When in traveling between the sealed orientation and the dispensing orientation, the dispensing-side gasket material 932 may rotate against the internal surface of the front wall of the valve body 908, the printing substance inlet port, and/or the receiving-side mating interface. In this manner, a seal may be maintained against the above-mentioned components as rotation occurs. Further, the dispensing-side gasket material 932 may perform a wiping function against the above-mentioned components keeping the areas free of excess printing substance and/or contaminants.

FIGS. 10A, 10B, 10O, and 10D illustrate a cross-sectional view of an example of device 1091 with a lockable printing substance dispensing nozzle 1010 consistent with the disclosure. The device 1091 may include a locking mechanism actuatable by mating a dispensing-side mating interface 1001 with a receiving-side mating interface 1052. FIGS. 10A-10D may illustrate a time-lapse of the actuation of the locking mechanism in the device 991 during mating of a dispensing-side mating interface 1001 with a receiving-side mating interface (not illustrated in FIGS. 10A-10D).

Figure 10A:
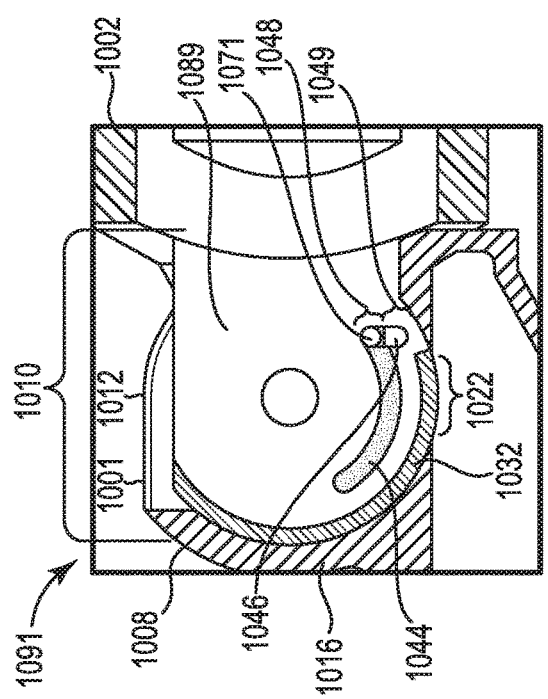
FIG. 10A illustrates a cross-sectional view of an example of device, with a lockable printing substance dispensing nozzle, in a locked and sealed orientation consistent with the disclosure.

In FIG. 10A, the device 1091 is illustrated in a locked position. The locked position may correspond to the sealed orientation of the printing dispensing nozzle 1010. For example, the locked position may refer to a state of the device 1091 where the printing substance dispensing nozzle 1010 is prevented from rotating within the valve body 1008. For example, in the locked and sealed position, an orifice (not visible in FIGS. 10A-10B) of the printing substance dispensing nozzle 1010 may be facing and/or blocked by the front wall 1016 of the valve body 1008 and the locking mechanism may prevent the rotation of the orifice to a different location of the front wall 1016.

In the locked and sealed position, the printing substance transfer window 1022 through the valve body 1008 may be occupied and/or obstructed by the dispensing-side gasket material 1032. Additionally, the orifice of the printing substance dispensing nozzle 1010 may be sealed against the front wall 1008 of the valve body 1008 by the dispensing-side gasket material 1032 encompassing the orifice within the valve body 1008.

In the locked and sealed position, the locking rod 1071 may be positioned in a first position of the locking rod window through a sidewall 1012 of the valve body 1008. The first position may correspond to a position in a lower portion of the locking rod window 1046 through a sidewall 1012 of the valve body 1008. The lower portion of the locking rod window 1046 may, in some examples, be a default position for the locking rod 1071 when the dispensing-side mating interface 1001 is not engaged with the receiving-side mating interface. For example, the force applied by an urging member to the locking pin 1099 that the locking rod 1071 is engaged with on the outside of the sidewall 1012 may bias the locking rod 1071 to a lower portion of the locking rod window 1046.

In the locked and sealed position, the locking rod 1071 may be positioned in a first portion 1049 of a locking rod channel 1044 extending through the sidewall 1089 and the body of the printing substance dispensing nozzle 1010. In the first portion 1049 of the locking rod channel 1044, the locking rod 1071 may be able to move along a first axis but be restricted from moving along a second axis. For example, the locking rod 1071 may be moveable up and/or down within the locking rod channel 1044 when located in the first portion 1049. However, the locking rod 1071 may be obstructed from moving side-to-side within the locking rod channel 1044 when located in the first portion 1049. In the orientation illustrated in FIG. 10A, rotation of the printing substance dispensing nozzle 1010 toward a printing substance transfer window 1022 may involve the locking pin 1071 traveling side-to-side within the locking rod channel 1044.

Figure 10B:
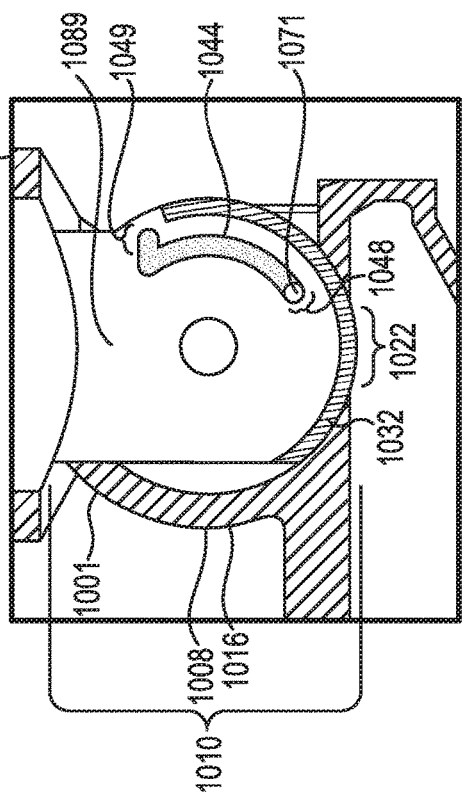
FIG. 10B illustrates a cross-sectional view of an example of device, with a lockable printing substance dispensing nozzle, in an unlocked and sealed orientation consistent with the disclosure.
Figure 10C:
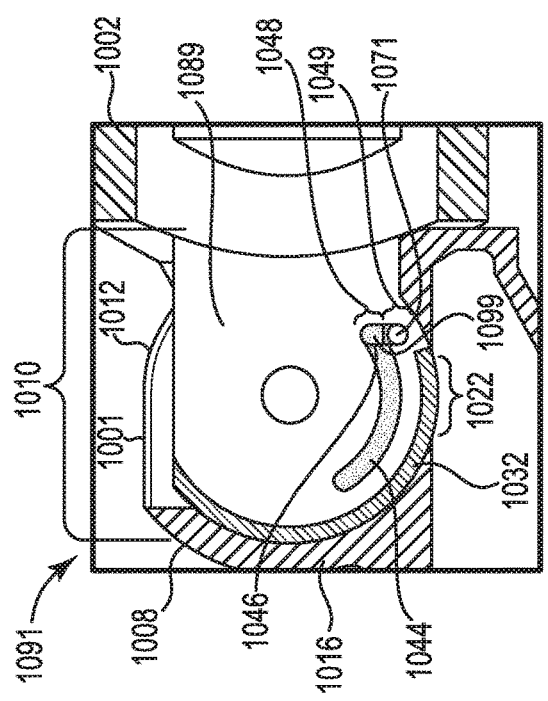
FIG. 10O illustrates a cross-sectional view of an example of device, with a lockable printing substance dispensing nozzle, in an unlocked and rotating orientation consistent with the disclosure.
FIG. 10D illustrates a cross-sectional view of an example of device, with a lockable printing substance dispensing nozzle, in an unlocked and fully-opened orientation consistent with the disclosure.

In FIG. 10B, the device 1091 is illustrated in an unlocked and sealed position. For example, in the unlocked and sealed position the printing substance dispensing nozzle 1010 is no longer prevented from rotating within the valve body 1008 but the printing substance dispensing nozzle 1010 remains in the sealed orientation. For example, in the unlocked and sealed position, an orifice of the printing substance dispensing nozzle 1010 may be facing and/or blocked by the front wall 1016 of the valve body 1008 despite having an unobstructed ability to rotate to a different location of the front wall 1016.

In the unlocked and sealed position, the printing substance transfer window 1022 through the valve body 1008 may still be occupied and/or obstructed by the dispensing-side gasket material 1032. Additionally, the orifice of the printing substance dispensing nozzle 1010 may still be sealed against the front wall 1008 of the valve body 1008 by the dispensing-side gasket material 1032 encompassing the orifice within the valve body 1008.

In the unlocked and sealed position, the dispensing-side mating interface 1001 may be fully engaged with the receiving-side mating interface. As such, the dispensing-side gasket material 1032 may be protruding through the printing substance transfer window 1022. The dispensing-side gasket material 1032 may be protruding through the printing substance transfer window 1022 may contact a printing substance inlet port and/or a receiving-side gasket material around a printing substance inlet port of the receiving-side mating interface. For example, the dispensing-side gasket material 1032 may be protruding through the printing substance transfer window 1022 to seal off the printing substance inlet port, replacing the seal provided by an inlet port door pushed away from the printing substance inlet port by the dispensing-side mating interface 1001.

In the unlocked and sealed position, the locking rod 1071 may be positioned in a second position of the locking rod window 1046 through a sidewall 1012 of the valve body 1008. The second position may correspond to a position in an upper portion of the locking rod window 1046 through a sidewall 1012 of the valve body 1008. In an example, during mating of the dispensing-side mating interface 1001 to a receiving-side mating interface, a force may be applied to the locking rod 1071 that is greater than the biasing force applied by an urging member to a locking pin 1099 that the locking rod 1071 is engaged with on the outside of the sidewall 1012. As such, the force may translate the locking rod 1071 into a position in the upper portion of the locking rod window 1046. For example, a portion of the locking rod 1071 outside of the valve body 1008 may have engaged with and traveled along a ramp of a receiving-side mating interface as the dispensing-side mating interface 1001 was slid into engagement with the receiving-side mating interface. The force applied to the printing substance dispensing container 1002 to slide the dispensing-side mating interface 1001 into engagement with the receiving-side mating interface may be translated by the ramp into an urging force to move the locking rod 1071 into upper portion of the locking rod window 1046. Additionally, the force may translate the locking pin 1099 into a locking pin housing.

The portion of the locking rod 1071 outside of the valve body 1008 may have engaged with a catch of the ramp of a receiving-side mating interface. The catch on the ramp may obstruct the locking rod 1071 from traveling back along the ramp to disengage the dispensing-side mating interface 1001 from the receiving-side mating interface. However, by pulling the printing substance dispensing container 1002 in a reverse direction from the direction of engagement between the dispensing-side mating interface 1001 from the receiving-side mating interface, the pulling force may be translated by the catch to an urging force urging the locking rod 1071 back into the lower portion of the locking rod window 1046. Additionally, the force may urge the locking rod 1071 back under and/or free of the catch.

In the unlocked and sealed position, the locking rod 1071 may be positioned in an entrance position of a second portion 1048 of a locking rod channel 1044 extending through the sidewall 1089 and the body of the print substance dispensing nozzle 1010. In the entrance position of the second portion 1048 of the locking rod channel 1044, the locking rod may be located immediately adjacent to the first portion 1049 of the locking rod channel 1044. As such, the locking rod 1071 may be moveable along a first axis and a second axis. For example, the locking rod 1071 may be moveable up and/or down and side-to-side within the locking rod channel 1044 when located in the entrance position of the second portion 1048 of the locking rod channel 1044. In the orientation illustrated in FIG. 10B, rotation of the printing substance dispensing nozzle 1010 toward a printing substance transfer window 1022 may involve the locking pin 1071 traveling side-to-side within the locking rod channel 1044.

In FIG. 10O, the device 1091 is illustrated in an unlocked and rotating position. For example, in the unlocked and rotating position the printing substance dispensing nozzle 1010 is rotating within the valve body 1008 toward the printing substance transfer window 1022. That is, the printing substance dispensing nozzle 1010 is rotating from a sealed orientation to a dispensing orientation.

In the unlocked and rotating position, the dispensing-side mating interface 1001 may be fully engaged with the receiving-side mating interface. The printing substance transfer window 1022 through the valve body 1008 may still be occupied and/or obstructed by the dispensing-side gasket material 1032. Additionally, the orifice of the printing substance dispensing nozzle 1010 may still be sealed against the front wall 1008 of the valve body 1008 by the dispensing-side gasket material 1032 encompassing the orifice within the valve body 1008.

However, in the unlocked and rotating position the dispensing-side gasket 1032 may contact and rotate against the front wall 1016 of the valve body 1008, wiping it clean. Further, the dispensing-side gasket 1032 may contact and rotate against a printing substance inlet port and/or a receiving-side gasket material encompassing the printing substance inlet port of a receiving-side mating interface. The maintained contact may keep the inlet port sealed and the wiping action may wipe the printing substance inlet port and/or a receiving-side gasket material clean.

In the unlocked and rotating position, the locking rod 1071 may remain positioned in the second position of the locking rod window 1046, corresponding to the upper portion of the locking rod window 1046. A portion of the locking rod 1071 outside of the valve body 1008 may have engaged with a catch of the ramp of a receiving-side mating interface that obstructs the locking rod 1071 from traveling back along the ramp to disengage the dispensing-side mating interface 1001 from the receiving-side mating interface.

The locking rod 1071 may be positioned in any of a plurality of travel positions of a second portion 1048 of a locking rod channel 1044. The locking rod channel 1044 may extend through the sidewall 1089 and the body of the print substance dispensing nozzle 1010. In a travel position of the second portion 1048 of the locking rod channel 1044, the locking rod 1071 may be obstructed from moving along a first axis but may be moveable along a second axis within the locking rod channel 1044. For example, the locking rod 1071 may be obstructed from up and down movement within the locking rod channel 1044 but may be moveable side-to-side within the locking rod channel 1044. Further, once the locking rod 1071 is in a travel position within the second portion 1048 of a locking rod channel 1044 the locking rod 1071 may be obstructed from moving back into a lower portion of the locking rod window 1046. As such, when pulling the print substance dispensing container 1002 in a reverse direction from the direction of engagement between the dispensing-side mating interface 1001 from the receiving-side mating interface the locking rod channel 1044 the locking rod 1071 may be obstructed from moving back into the lower portion of the locking rod window 1046. As a result, the locking rod channel 1044 may obstruct the portion of the locking rod 1071 outside of the valve body 1008 from moving below and/or disengaging from the catch of the ramp on the receiving-side mating interface. Therefore, the locking rod channel may obstruct the disengagement of the dispensing-side mating interface 1001 from the receiving-side mating interface.

Figure 10D:
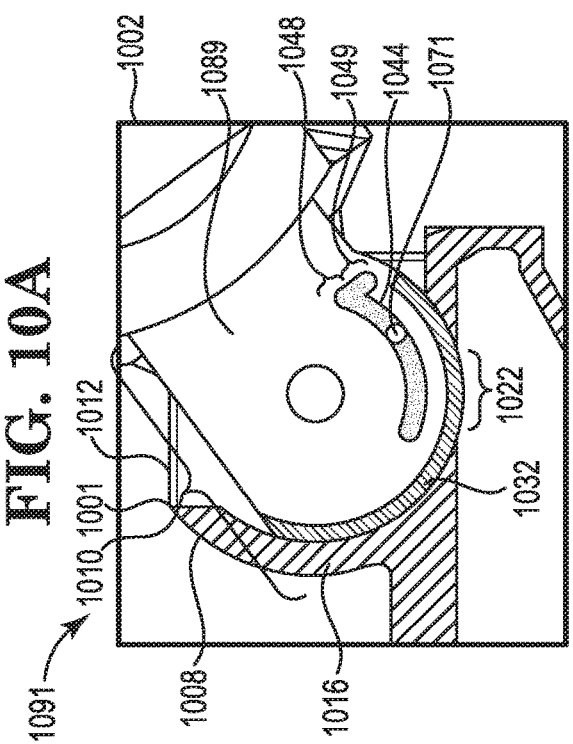

In FIG. 10D, the device 1091 is illustrated in an unlocked and fully-opened position. In the unlocked and fully-open position, the dispensing-side mating interface 1001 may be fully engaged with the receiving-side mating interface. The printing substance dispensing nozzle 1010 may be in a dispensing orientation. For example, the orifice of the printing substance dispensing nozzle 1010 may be facing the printing substance transfer window 1022. The orifice of the printing substance dispensing nozzle 1010 may be aligned with an inlet port of the receiving-side mating interface through the printing substance transfer window 1022. The dispensing-side gasket material 1032 encompassing the orifice may be in contact with a receiving-side gasket material encompassing the inlet port. As such, the dispensing-side gasket material 1032 and the receiving-side gasket material may contact one another to form a seal around the aligned orifice and inlet port.

In the unlocked and fully-open position, the locking rod 1071 may remain positioned in the second position, corresponding to an upper portion, of the locking rod window 1046 through a sidewall 1012 of the valve body 1008. The portion of the locking rod 1071 outside of the valve body 1008 may remain engaged with the catch of the ramp of a receiving-side mating interface.

The locking rod 1071 may be positioned in a fully-opened position of a second portion 1048 of a locking rod channel 1044 extending through the sidewall 1089 and the body of the printing substance dispensing nozzle 1010. In a fully-opened position of the second portion 1048 of the locking rod channel 1044, the locking rod 1071 may be obstructed from moving along a first axis but may be moveable along a second axis within the locking rod channel 1044. For example, the locking rod 1071 may be obstructed from up and down movement within the locking rod channel 1044 but may be moveable side-to-side within the locking rod channel 1044. Further, the locking rod 1071 may remain obstructed from moving back into a lower portion of the locking rod window 1046. Furthermore, the locking rod channel 1044 may continue to obstruct the portion of the locking rod 1071 outside of the valve body 1008 from moving below and/or disengaging from the catch of the ramp on the receiving-side mating interface. Therefore, the locking rod channel may obstruct the disengagement of the dispensing-side mating interface 1001 from the receiving-side mating interface.

In the unlocked and fully-opened position the device 1091 may be utilized to transfer a printing substance from the printing substance dispensing device 1002 to a printing substance receiving container through the printing substance transfer window 1022. For example, a printing substance may be transferred out of a printing substance dispensing container 1002 through orifice of the printing substance dispensing nozzle 1010 and through the printing substance transfer window 1022 into a printing substance inlet port in a receiving-side mating interface of a printing substance receiving container.

Once the printing substance transfer has been completed, the device 1091 may be locked, sealed, and/or disengaged from the receiving-side mating interface. For example, the lock mechanism may be actuated in a reverse sequence starting at the unlocked and fully-opened position and ending at the locked and sealed position. In performing such a reverse sequence, the rotation of the dispensing-side gasket material 1032 and/or the orifice against the receiving-side gasket material, the printing substance inlet port, and/or the front wall 1016 may wipe away and/or absorb excess printing substance and/or environmental contaminants.

A transfer of a printing substance is blocked by the front wall 1016 and/or the dispensing-side gasket material 1032 when the printing substance dispensing nozzle 1010 is in the sealed orientation. A device 1091 may be locked in the locked and sealed orientation until the dispensing-side mating interface 1001 is fully engaged with the receiving-side mating interface. The dispensing-side mating interface 1001 may be fully engaged with the receiving-side mating interface when the printing substance transfer window 1022 is aligned over the printing substance inlet port of the receiving-side mating interface. As such, the device 1091 may prevent the premature dispensing of a printing substance.

Likewise, the device 1091 may return to the locked and sealed orientation before the dispensing-side mating interface 1001 is configured to allow an unobstructed disengagement from the receiving-side mating interface. The disengagement of the dispensing-side mating interface 1001 from the receiving-side mating interface may include pulling the printing substance transfer window 1022 out of alignment away from a position over the printing substance inlet port of the receiving-side mating interface. As such, the device 1091 may prevent a late dispensing of a printing substance.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure; and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. In an example, an element such as 102 in FIG. 1 may be an example of a similar, identical, or interchangeable element with an element 202 in FIG. 2. Elements shown in the various figures herein can be added, exchanged, and/or eliminated so as to provide a plurality of additional examples of the present disclosure. The figures are not intended as limiting examples and it is contemplated that the elements depicted or described with regard to any one of them is interchangeable, applicable, and/or combinable with elements of the others. In addition, the proportion and the relative scale of the elements provided in the figures are intended to illustrate the examples of the present disclosure and should not be taken in a limiting sense. Furthermore, the terminology utilized herein referring to directionality such as up, down, side, top, bottom, etc. is utilized relative to the orientation of the drawings to provide clarity. That is, the terminology user herein may be applied without reference to the earth's surface and/or an orientation of a user relative to the system, device, and/or the earth's surface. Therefore, it is contemplated that the systems and devices described herein may be utilized in any orientation relative to the surface of the earth or a position of a user. As such, the movement of a component upward with respect to its orientation in a figure included herein may translate to a movement of the component downward with respect to the earth's surface and/or a user's orientation.

What is claimed:

1. A device, comprising:
   a valve body;
   a printing substance dispensing nozzle rotatable within the valve body between a sealed orientation and a dispensing orientation; and
   a locking rod extending through a locking rod window in the valve body and into a locking rod channel in the printing substance dispensing nozzle, wherein the locking rod is movable within the locking rod window between a first position, fixing the printing substance dispensing nozzle in the sealed orientation, and a second position allowing rotation of the printing substance dispensing nozzle to the dispensing orientation, wherein the locking rod engages a locking pin outside of the valve body.

2. The device of claim 1, wherein a movement of the locking rod from the first position to the second position within the locking rod window translates to a movement of the locking rod from a first portion of the locking rod channel to a second portion of the locking rod channel.

3. The device of claim 1, wherein a portion of the locking pin is movable within a locking pin housing protruding from the valve body.

4. The device of claim 3, including an urging member within the locking pin housing to apply a force against the portion of the locking pin within the locking pin housing.

5. The device of claim 4, wherein the force against the portion of the locking pin within the locking housing biases the locking rod into the first position.

6. A device, comprising:
   a dispensing-side mating interface including:
      a valve body;
      a printing substance dispensing nozzle rotatable within the valve body between a sealed orientation and a dispensing orientation; and
      a locking rod extending through a locking rod channel in the printing substance dispensing nozzle, wherein the locking rod is movable between a first portion of the locking rod channel, fixing the printing substance dispensing nozzle in the sealed orientation, and a second portion of the locking channel allowing rotation of the printing substance dispensing nozzle; and
   a receiving-side mating interface including:
      a ramp ascending from a face of the receiving-side mating interface, the ramp to shift the locking rod from the first portion of the locking rod channel to the second portion of the locking channel as the dispensing-side mating interface is mated to the receiving-side mating interface, wherein the ramp includes a catch to prevent the locking rod from descending the ramp, and the locking rod engages the catch when the locking rod fully enters into the second portion of the locking rod channel.

7. The device of claim 6, wherein the valve body of the dispensing-side mating interface includes a printing substance transfer window through the valve body, and wherein the receiving-side mating interface includes a printing substance inlet port through the face of the receiving-side mating interface.

8. The device of claim 7, wherein the ramp is positioned along the face such that the locking rod fully enters into the second portion of the locking channel upon the printing substance transfer window reaching an alignment with the printing substance inlet port.

9. The device of claim 6, wherein rotating the printing substance dispensing nozzle to the dispensing orientation blocks the locking rod from entering the first portion of the locking channel and disengaging the catch.

10. A system, comprising:
    a dispensing-side mating interface including:
       a valve body;
       a printing substance dispensing nozzle rotatable within the valve body between a sealed orientation and a dispensing orientation;
       a locking rod extending through a locking rod channel in the printing substance dispensing nozzle, wherein the locking rod is movable between a first portion of the locking rod channel, fixing the printing substance dispensing nozzle in the sealed orientation, and a second portion of the locking rod channel allowing rotation of the printing substance dispensing nozzle;
    a receiving-side mating interface including:
       a printing substance inlet port through a face of the receiving-side mating interface;
       a ramp ascending from the face of the receiving-side mating interface, the ramp to shift the locking rod from the first portion of the locking rod channel to the second portion of the locking channel as the dispensing-side mating interface is mated to the receiving-side mating interface, wherein the locking rod engages a locking pin outside of the valve body.

11. The system of claim 10, wherein the sealed orientation includes an alignment of an orifice of the printing substance dispensing nozzle with an internal wall of the valve body.

12. The system of claim 10, wherein the dispensing orientation includes an alignment of an orifice of the printing substance dispensing nozzle with the printing substance inlet port through a printing substance transfer window through the valve body.

13. The system of claim 10, wherein the dispensing-side mating interface includes guide members slide-able within complementary channels over the face of the receiving-side mating interface to mate the dispensing-side mating interface to the receiving-side mating interface.

* * * * *